(12) United States Patent
Meyer et al.

(10) Patent No.: US 11,025,563 B2
(45) Date of Patent: Jun. 1, 2021

(54) SPACE-AWARE NETWORK SWITCH

(71) Applicant: Johnson Controls Technology Company, Auburn Hills, MI (US)

(72) Inventors: Sheri L. Meyer, Wauwatosa, WI (US); Radu M. Dorneanu, Greendale, WI (US); Mark L. Ziolkowski, New Berlin, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 9 days.

(21) Appl. No.: 16/261,301

(22) Filed: Jan. 29, 2019

(65) Prior Publication Data

US 2019/0158431 A1 May 23, 2019

Related U.S. Application Data

(63) Continuation-in-part of application No. 16/132,045, filed on Sep. 14, 2018, now Pat. No. 10,599,115, (Continued)

(51) Int. Cl.
*H04L 12/00* (2006.01)
*H04L 12/931* (2013.01)
(Continued)

(52) U.S. Cl.
CPC .............. *H04L 49/35* (2013.01); *G05B 15/02* (2013.01); *G05B 19/0426* (2013.01); (Continued)

(58) Field of Classification Search
CPC ..... H04L 49/35; H04L 43/0876; H04L 49/25; H04L 67/12; H04L 47/70; G05B 15/02; (Continued)

(56) References Cited

U.S. PATENT DOCUMENTS 6,148,306 A 11/2000 Seidl et al.
6,792,319 B1 9/2004 Bilger
(Continued)

FOREIGN PATENT DOCUMENTS

CN 102804084 11/2012
EP 1 770 454 A1 4/2007
(Continued)

OTHER PUBLICATIONS

U.S. Appl. No. 15/821,472, filed Nov. 22, 2017, Chatterjee, et al.
(Continued)

*Primary Examiner* — Lakeram Jangbahadur
(74) *Attorney, Agent, or Firm* — Foley & Lardner LLP

(57) ABSTRACT

A network switch includes a device interface configured to facilitate communication between the network switch and a plurality of building devices that serve a space, network routing circuitry configured to route network communications associated with the building devices in accordance with one or more network parameters, a control circuit configured to control the plurality of devices via the network communications to provide a plurality of space use cases for the space. and a network manager circuit configured to determine values for the one or more network parameters based on the plurality of space use cases for the space.

17 Claims, 12 Drawing Sheets

Related U.S. Application Data which is a continuation-in-part of application No. 15/952,173, filed on Apr. 12, 2018, now Pat. No. 10,156,833.

(60) Provisional application No. 62/623,939, filed on Jan. 30, 2018, provisional application No. 62/560,567, filed on Sep. 19, 2017, provisional application No. 62/485,282, filed on Apr. 13, 2017.

(51) Int. Cl.
    *G05B 19/042*      (2006.01)
    *H04L 29/08*      (2006.01)
    *H04L 12/947*      (2013.01)
    *G05B 15/02*      (2006.01)
    *H04L 12/26*      (2006.01)
    *H04L 12/911*      (2013.01)

(52) U.S. Cl.
    CPC .......... *H04L 43/0876* (2013.01); *H04L 49/25* (2013.01); *H04L 67/12* (2013.01); *G05B 2219/23011* (2013.01); *G05B 2219/25011* (2013.01); *H04L 47/70* (2013.01)

(58) Field of Classification Search
    CPC ...... G05B 19/0426; G05B 2219/25011; G05B 2219/23011
    See application file for complete search history.

(56) References Cited

U.S. PATENT DOCUMENTS

| | | |
|---|---|---|
| 6,909,921 B1 | 6/2005 | Bilger |
| 9,459,607 B2 | 10/2016 | Frazer et al. |
| 9,475,359 B2 | 10/2016 | Mackay |
| 9,521,009 B1 | 12/2016 | Skeffington |
| 9,733,656 B2 | 8/2017 | Janoso et al. |
| 10,156,833 B2 | 12/2018 | Ray et al. |
| 10,234,836 B2 | 3/2019 | Duchene et al. |
| 2004/0267385 A1 | 12/2004 | Lingemann |
| 2007/0219645 A1 | 9/2007 | Thomas et al. |
| 2008/0277486 A1 | 11/2008 | Seem et al. |
| 2008/0281472 A1 | 11/2008 | Podgorny et al. |
| 2009/0300174 A1 | 12/2009 | Floris et al. |
| 2010/0262298 A1 | 10/2010 | Johnson et al. |
| 2010/0280636 A1* | 11/2010 | Holland .............. H04L 12/2816 700/90 |
| 2010/0307731 A1 | 12/2010 | Yonezawa et al. |
| 2010/0324962 A1 | 12/2010 | Nesler et al. |
| 2011/0047418 A1 | 2/2011 | Drees et al. |
| 2011/0087650 A1* | 4/2011 | Mackay ................. G05B 15/02 707/722 |
| 2011/0093126 A1 | 4/2011 | Toba et al. |
| 2011/0178977 A1 | 7/2011 | Drees |
| 2012/0001487 A1 | 1/2012 | Pessina |
| 2012/0029661 A1 | 2/2012 | Jones et al. |
| 2012/0083937 A1 | 4/2012 | Kong et al. |
| 2013/0218349 A1 | 8/2013 | Coogan et al. |
| 2013/0257626 A1 | 10/2013 | Masli et al. |
| 2013/0268128 A1 | 10/2013 | Casilli et al. |
| 2013/0297259 A1 | 11/2013 | Tsao et al. |
| 2014/0023363 A1 | 1/2014 | Apte |
| 2014/0195664 A1 | 7/2014 | Rahnama |
| 2014/0277765 A1 | 9/2014 | Karimi et al. |
| 2014/0316582 A1 | 10/2014 | Berg-Sonne et al. |
| 2015/0005900 A1 | 1/2015 | Steele et al. |
| 2015/0032265 A1 | 1/2015 | Herring et al. |
| 2015/0066169 A1 | 3/2015 | Nakano et al. |
| 2015/0088570 A1 | 3/2015 | Yenni et al. |
| 2015/0140990 A1 | 5/2015 | Kim et al. |
| 2015/0159893 A1 | 6/2015 | Daubman et al. |
| 2015/0168926 A1 | 6/2015 | Wood |
| 2015/0285527 A1 | 10/2015 | Kim et al. |
| 2015/0293508 A1* | 10/2015 | Piaskowski ............ G05B 15/02 700/275 |
| 2015/0312696 A1 | 10/2015 | Ribbich et al. |
| 2015/0370927 A1 | 12/2015 | Flaherty et al. |
| 2016/0020918 A1 | 1/2016 | Lu |
| 2016/0091217 A1* | 3/2016 | Verberkt ................. F24F 11/30 700/276 |
| 2016/0095188 A1 | 3/2016 | Verberkt et al. |
| 2016/0127174 A1 | 5/2016 | Fu et al. |
| 2016/0147207 A1 | 5/2016 | Park et al. |
| 2016/0258641 A1 | 9/2016 | Cheatham et al. |
| 2016/0282825 A1 | 9/2016 | Kariguddaiah |
| 2016/0320760 A1 | 11/2016 | Brun et al. |
| 2017/0026194 A1 | 1/2017 | Vijayrao et al. |
| 2017/0124842 A1 | 5/2017 | Sinha et al. |
| 2017/0191695 A1 | 7/2017 | Bruhn et al. |
| 2017/0195130 A1 | 7/2017 | Landow et al. |
| 2017/0234067 A1* | 8/2017 | Fasi ........................ E05F 15/71 700/275 |
| 2017/0281819 A1 | 10/2017 | Jones et al. |
| 2017/0350615 A1 | 12/2017 | Ashar |
| 2017/0366414 A1 | 12/2017 | Hamilton et al. |
| 2018/0005195 A1 | 1/2018 | Jacobson |
| 2018/0101146 A1 | 4/2018 | Hariharan et al. |
| 2018/0113897 A1 | 4/2018 | Donlan et al. |
| 2018/0120778 A1 | 5/2018 | Billings |
| 2018/0120788 A1 | 5/2018 | Billings |
| 2018/0191197 A1 | 7/2018 | Carr et al. |
| 2018/0210438 A1 | 7/2018 | Ashar et al. |
| 2018/0270063 A1 | 9/2018 | Bard et al. |
| 2018/0276775 A1 | 9/2018 | Khurana et al. |
| 2018/0299845 A1 | 10/2018 | Ray et al. |
| 2018/0314277 A1 | 11/2018 | Moore et al. |
| 2019/0011894 A1 | 1/2019 | Meyer et al. |
| 2019/0203532 A1 | 7/2019 | Feldstein |
| 2019/0250575 A1 | 8/2019 | Jonsson |

FOREIGN PATENT DOCUMENTS

| | | |
|---|---|---|
| WO | WO-2010/141601 A2 | 12/2010 |
| WO | WO-2016/180754 A1 | 11/2016 |
| WO | WO-2017/007418 | 1/2017 |

OTHER PUBLICATIONS

Anonymous: "Delta Building Management and Controls System". Internet Article. Retrieved from the Internet: URL:http://www.deltaww.com/filecenter/solu tions/download/05/Delta BMCS LDALISolution Guide 201608 eng.pdf?CID=23. Sep. 1, 2016. 17 pages.
Final Office Action on U.S. Appl. No. 15/952,211 dated Dec. 13, 2018. 8 pages.
International Search Report and Written Opinion on International Patent Application No. PCT/US2018/027396 dated Jun. 27, 2018. 16 pages.
International Search Report and Written Opinion on International Patent Application No. PCT/US2018/051182 dated Nov. 22, 2018. 17 pages.
Non-Final Office Action on U.S. Appl. No. 16/186,302 dated Jan. 15, 2019. 12 pages.
Notice of Allowance on U.S. Appl. No. 15/952,173 dated Aug. 10, 2018. 8 pages.
Notice of Allowance on U.S. Appl. No. 16/186,230 dated Jan. 2, 2019. 9 pages.
Office Action on U.S. Appl. No. 15/952,211 dated Jun. 25, 2018. 7 pages.
Office Action on U.S. Appl. No. 15/952,214 dated Jul. 13, 2018. 10 pages.
Rowland et al. "Designing Connected products: UX for the Consumer Internet of Things". May 31, 2015. pp. 2, 5-6, 8-14, 32-35, 48-49, 52, 93, 95-99, 123, 307, 312, 395, 532, 613-625.
Sinopoli: "Smart Buildings Systems for Architects, Owners and Builders". Nov. 18, 2009. p. 3-8, 129-136, chapters 3, 4, 5 and 6.
Wikipedia: "Building automation" Internet Article, Retrieved from the Internet: URL:https://en.wikipedia.org/w/index.php?title=Buildingautomation&oldid=799424260. Sep. 7, 2017. 12 pages.

(56) References Cited

OTHER PUBLICATIONS

Wikipedia: "Building management system", Internet Article, Retrieved from the Internet: URL:https://en.wikipedia.org/w/index.php?title=Building management system&oldid=797980461. Aug. 30, 2017. 4 pages.
Levin, "Preprocessing Data", URL: https://www.percona.com/blog/2011/08/08/preprocessingdata/, Aug. 8, 2011, 5 pages.
Yeh et al., "iPower: An Energy Conservation System for Intelligent Buildings by Wireless Sensor Networks," Inderscience Intl Jrnl of Sensor Networks, Year 2009, 9 pages.
Office Action on CN 201880037206.8, dated Oct. 13, 2020, 9 pages with English language translation.
U.S. Appl. No. 16/927,759, filed Jul. 13, 2020, Johnson Controls Technology Co.
U.S. Appl. No. 16/927,766, filed Jul. 13, 2020, Johnson Controls Technology Co.
U.S. Appl. No. 16/984,945, filed Aug. 4, 2020, Johnson Controls Technology Co.
Riley et al., "Airborne Spread of Measles in a Suburban Elementary School," American Journal of Epidemiology, 1978, 107:5, pp. 421-432.
Sterling et al., "Criteria for Human Exposure to Humidity on Occupied Buildings," ASHRAE Transactions, 1985, vol. 91, Part 1, CH85-13 No. 1, pp. 611-622.
Office Action on EP 18789285.6, dated Jan. 26, 2021, 7 pages.

\* cited by examiner

SPACE-AWARE NETWORK SWITCH

CROSS-REFERENCE TO RELATED PATENT APPLICATION

This application claims the benefit of and priority to U.S. Provisional Patent Application No. 62/623,939, filed Jan. 30, 2018. This application is a continuation-in-part of U.S. patent application Ser. No. 16/132,045, filed Sep. 14, 2018, which claims the benefit of and priority to U.S. Provisional Application No. 62/560,567, filed Sep. 19, 2017. U.S. patent application Ser. No. 16/132,045 is also a continuation-in-part of U.S. patent application Ser. No. 15/952,173, filed Apr. 12, 2018, which claims the benefit of and priority to U.S. Provisional Patent Application No. 62/485,282, filed Apr. 13, 2017. All of these applications are incorporated by reference herein in their entireties.

BACKGROUND

Buildings are used and experienced by people seeking to accomplish tasks and otherwise achieve goals in or around the buildings. Buildings, building systems, and the equipment and devices that affect environmental conditions of the buildings may significantly impact the ability of occupants to satisfactorily complete tasks by providing—or failing to provide—environments suitable to the tasks.

In some cases, architects and other building designers have human goals and tasks in mind when designing places (e.g., buildings, campuses) and spaces (e.g., rooms, floors, etc. that compose a place). However, existing building systems are siloed across building domains (e.g., HVAC, fire, access, security, lighting, etc.), requiring a disjointed approach to designing and operating building systems. Building system design, installation, configuration, and operation typically requires domain-specific expertise at a level of detail which may cause higher-level design to be obscured or lost. Information technologies that facilitate electronic communications between building devices are also designed and configured with a focus on details of information technology, rather than on the human goals and tasks for a space or place. By requiring design and operation of building systems to focus on domain-specific granular implementation details, existing systems and methods for building system design and operation stifle attempts to provide spaces and places that satisfactorily support human tasks and goals.

Systems and methods that improve the ability of building systems to support people in accomplishing tasks and achieving goals are therefore desirable.

SUMMARY

One implementation of the present disclosure is a network switch. The network switch includes a device interface configured to facilitate communication between the network switch and a plurality of building devices that serve a space, network routing circuitry configured to route network communications associated with the building devices in accordance with one or more network parameters, a control circuit configured to control the plurality of devices via the network communications to provide a plurality of space use cases for the space. and a network manager circuit configured to determine values for the one or more network parameters based on the plurality of space use cases for the space.

In some embodiments, the control circuit is configured to associate each space use case with a priority. The network manager circuit is configured to adjust the one or more network parameters based on the priorities of the plurality of space use cases for the space. In some embodiments, a first space use case of the plurality of space use cases is associated with a first priority and a second space use case of the plurality of space uses cases is associated with a second priority. The network manager circuit is configured to assign a first set of one or more quality of service parameters for communications relating to the first space use case and a second set of one or more quality of service parameters for communications relating the second space use case based on the first priority and the second priority.

In some embodiments, the control circuit is configured to select a set of the plurality of space use cases as active space use cases and update the set of active space use cases in response to an event or condition relating to the space. The network manager circuit is configured to update the one or more network parameters based on a change to the subset of active space use cases. In some embodiments, the one or more network parameters include at least one of a quality of service parameter or a dedicated bandwidth.

In some embodiments, the network manager circuit is configured to provide an indication of an availability of the one or more network resources to the control circuit. The control circuit is configured to initiate activation of a first space use case of the plurality of space use cases. A first network resource required for execution of the first space use case. The control circuit is also configured to determine, based on the indication of the availability of network resources, whether the first network resource is available, activate the first space use case in response to a determination that the first network resource is available, prevent the activation of the first space use case in response to a determination that the first network resource is not available.

In some embodiments, the building devices are associated with a plurality of building domains.

Another implementation of the present disclosure is a method. The method includes routing, at a network switch and in accordance with one or more network parameters, network communications associated with a plurality of building devices that serve a space. The method also includes controlling, via the network communications, the plurality of building devices to provide a plurality of space use cases for the space. The method also includes determining values for the one or more network parameters based on the plurality of space use cases for the space.

In some embodiments, each space use case is associated with a priority. The method comprises adjusting the one or more network parameters based on the priorities of the plurality of space use cases for the space. In some embodiments, a first space use case of the plurality of space use cases is associated with a first priority and a second space use case of the plurality of space uses cases is associated with a second priority. Adjusting the one or more network parameters based on the priorities of the plurality of space use cases for the space includes assigning a first set of one or more quality of service parameters for network communications relating to the first space use case and a second set of quality of service parameters for network communications relating the second space use case based on the first priority and the second priority.

In some embodiments, the method includes selecting a set of the plurality of space use cases as active space use cases, updating the set of active space use cases in response to an event or condition relating to the space, and updating the one or more network parameters based on a change in the subset of active space use cases. In some embodiments, the one or more network parameters include at least one of a quality of service parameter or a dedicated bandwidth.

In some embodiments, the method includes obtaining an indication of an availability of one or more network resources and initiating activation of a first space use case of the plurality of space use cases. A first network resource required for execution of the first space use case. The method also includes determining, based on the indication of the availability of network resources, whether the first network resource is available, activating the first space use case in response to a determination that the first network resource is available, and preventing the activation of the first space use case in response to a determination that the first network resource is not available.

In some embodiments, the building devices are associated with a plurality of building domains.

Another implementation of the present disclosure is a building management system. The building management system includes a plurality of building devices configured to serve a space and a network switch communicably coupled to the network. The network switch includes network routing circuitry configured to route network communications associated with the building devices in accordance with one or more network parameters, a control circuit coupled to the network circuitry and configured to control the plurality of devices via the network communications to provide a plurality of space use cases for the space, and a network manager circuit coupled to the control circuit and configured to determine values for the one or more network parameters based on the plurality of space use cases for the space.

In some embodiments, the control circuit is configured to associate each space use case with a priority. The network manager circuit is configured to adjust the one or more network parameters based on the priorities of the plurality of space use cases for the space.

In some embodiments, the control circuit is configured to select a set of the plurality of space use cases as active space use cases and update the set of active space use cases in response to an event or condition relating to the space. The network manager circuit is configured to update the one or more network parameters based on a change to the subset of active space use cases.

In some embodiments, the network manager circuit is configured to provide an indication of an availability of the one or more network resources to the control circuit. The control circuit is configured to initiate activation of a first space use case of the plurality of space use cases, a first network resource required for execution of the first space use case, determine, based on the indication of the availability of network resources, whether the first network resource is available, activate the first space use case in response to a determination that the first network resource is available, and prevent the activation of the first space use case in response to a determination that the first network resource is not available.

In some embodiments, the building devices are associated with a plurality of building domains. In some embodiments, the network communications are transmitted using an internet protocol.

DETAILED DESCRIPTION

Figure 1:
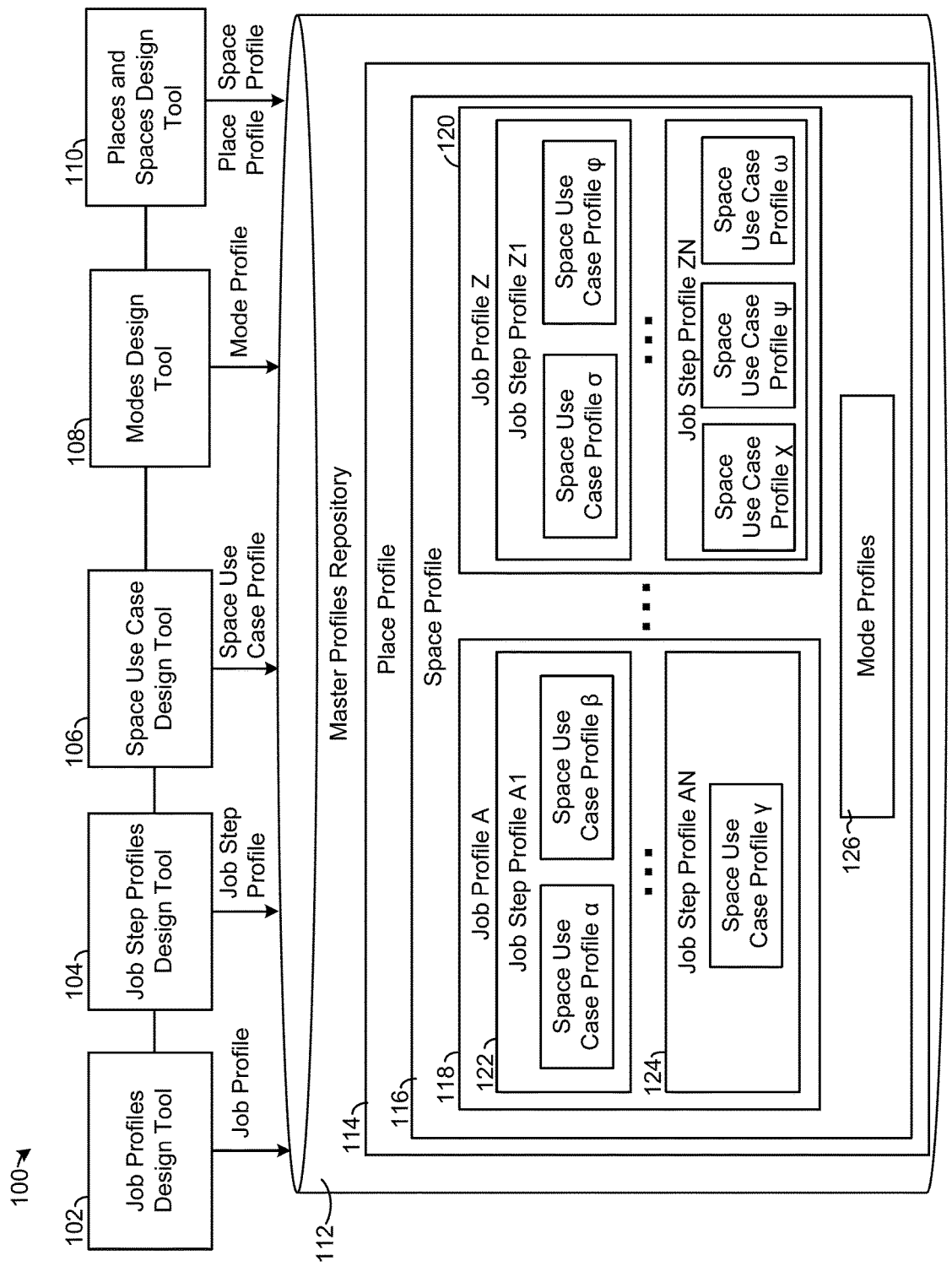
FIG. 1 is a block diagram of a system for creating and storing job profiles, job step profiles, space use case profiles, mode profiles, space profiles, and place profiles, according to an exemplary embodiment.

Referring generally to the FIGURES, systems and methods for designing and operating building systems based on jobs that people undertake in spaces and places are shown and described. The systems and methods shown and described herein rely on a unique framework, introduced by the present disclosure, which conceptualizes the design and operation of building systems for spaces and places based on jobs, job steps, use cases, and space use cases, each of which is defined below. As described in detail below, this framework may be applied in applications, tools, systems, apparatuses, and methods that facilitate the design and operation of building systems.

A space is a sub-unit of a place, for example a room or floor of a building. For the sake of brevity and clarity, a place may be considered to be a space (i.e., a space made up of spaces) as the term space is used herein. Accordingly, it should be understood that concepts, features, processes, etc. described herein with reference to spaces may also be applicable to places.

As used herein, a "job" refers to a goal or task that a person could work to accomplish. A job is solution agnostic, i.e., conceptually independent of the specific actions undertaken or the technologies used to complete the job. A job may be made up of a set of "job steps," which compose the job while remaining conceptually independent of the specific actions undertaken or the technologies used to complete each job step. Completing a job may require performance of multiple job steps in a particular order, in any order, or in some combination thereof. In some cases, one job may be completed by accomplishing various combinations of various job steps. Jobs and job steps are therefore aligned with the way people understand and conceptualize the work and goals that people seek to accomplish in spaces and places without being limited by particular manual or technological implementations. Jobs and job steps for a space may include jobs and job steps for building occupants at a space and for facility personnel that manage the space (e.g., facility managers, facility operators, security managers, energy managers, maintenance staff, custodial staff, etc.).

While jobs and job steps are solution-independent, the term "use case" as used herein refers to a solution-dependent action or set of actions to accomplish a job step. A use case may identify a particular technology (e.g., type of device, type of equipment) or set of technologies useable to accomplish a job step. A use case may also identify particular actions to be taken by automated technologies or by one or more people. A use case thereby describes an implementation of a job step. In many cases, multiple different use cases are possible for a single job step, reflecting the notion that a solution-independent job step may be accomplished in a variety of ways (i.e., by a variety of use cases). A use case may be applicable to various types of spaces (e.g., office, conference room, patient room, operating room, classroom, kitchen, restroom, etc.) for which a corresponding job step may be relevant.

A use case as applied to a space is a "space use case." A space use case further defines a use case based on characteristics of the relevant space or type of space. A space use case unifies a use case around a variety of technologies, occupants, and purposes of the space, for example the devices of building equipment that may be commonly found in a type of space and specialty or business systems affecting the space. Formulated in this space-centric way, a space use case is differentiated from traditional domain-centric frameworks that approach individual building domains separately. Space use cases thereby provide space-centric, unified definitions of how spaces may facilitate jobs and job steps. Space use cases bridge the gap between jobs and job steps—formulated in terms of human goals and objectives—and solutions unified around spaces to describe how spaces can support completion of job steps.

Together, jobs, job steps, use cases, and space use cases provide a framework that supports design and operation of building systems focused on what people seek to accomplish at a building while avoiding overwhelming low-level implementation details that have been the traditional focus of building design and operation. The framework may be applied in various design tools, data repositories, installation packages and tools, building management systems, online controllers, collections of building equipment, etc., as described in this application. For example, the framework may be well suited for application in a unified building management system, for example as described in U.S. Provisional Patent Application No. 62/636,504, incorporated by reference herein in its entirety. Example embodiments of various implementations are shown in the FIGURES and described in detail below.

Advantageously, the framework and implementations based thereon provide a consistent specification for modeling space use cases, provide a unified execution environment for space use cases, allow flexibility in terms of how space use cases are developed, deployed, and executed (e.g., developed and instantiated in any order and at any time), and/or offload people from resolving conflicts that may arise from combining jobs, job steps, or use cases. Furthermore, a building management system based on the framework described herein may provide environments through the implantation of space use cases instead of individual domain use cases, for example shifting the focus from individual building domains or integrations of a few building domains to a controlling entity that can coordinate, resolve conflicts between, and execute space use cases across all building domains, business systems, and/or specialty systems relating to a space. The space may thereby be made more efficient and effective in facilitating jobs done in the space.

Referring now to FIG. 1, a block diagram of a system 100 for creating and storing job profiles, job step profiles, space use case profiles, mode profiles, space profiles, and place profiles is shown, according to an exemplary embodiment. As used herein, the term "profile" refers to a data object that may contain various computer code, logic, data, attributes, files, etc. for characterizing various jobs, job steps, space use cases, modes, spaces, and places. A profile may include one or more other profiles. Profiles may be organized based on the use case framework described above. Accordingly, as described in detail below, the system 100 may be configured to provide for the creation and storage of job profiles, job step profiles, space use case profiles, mode profiles, space profiles, and place profiles.

The system 100 is shown to includes a job profiles design tool 102, a job step profiles design tool 104, a space use case design tool 106, a modes design tool 108, and a places and spaces design tool communicably coupled to a master profiles repository 112. It should be understood that the various design tools 102-110 are highly configurable. In some embodiments, the various design tools 102-110 may include various dedicated circuits, memory, processor(s), input/output devices, etc. operable to execute or facilitate the functions attributed thereto herein. In some embodiments, the various design tools 102-110 are provided as graphical user interfaces and/or graphical user interface components to a user on a user device (e.g., personal computer, smartphone, tablet, laptop), for example in an application or browser-based, internet-accessible format. For example, the various design tools 102-110 may be hosted and operated by a cloud server. Various other implementations are contemplated by the present disclosure.

The job profiles design tool 102 is configured to facilitate design, creation, and editing of job profiles, and the job step profiles design tool 104 facilitates design, creation, and editing of job step profiles (e.g., by a job designer). For example, the job profiles design tool 102 and the job step profiles design tool 104 may provide one or more graphical user interfaces that allow a user to input a design of a job or job step, respectively, and may generate a job profile and/or a job step profile based on the user input design.

A job profile characterizes a job that a person or people do at or relating to a space while a job step profile characterizes a job step to be done at or relating to a space. Jobs and job steps may include jobs and job steps for building occupants at a space and for facility personnel that manage the space (e.g., facility managers, facility operators, security managers, energy managers, etc.). Job profiles and job step profiles provide the specification for space use case creation and execution. For example, job profiles and/or job step profiles may contain desired outcomes, target metrics, required environmental actions, impacted environmental conditions, priority of the job or job step, among other possible characteristics. A job profile that characterizes a job may contain one or more job step profiles that characterize job steps that make up the job. The job profile may specify a sequence of the job steps. A job step profile may include limits on environmental actions for the job step, a sequence of environmental actions for a job step, etc.

A job profile captures a solution agnostic specification of a job and may be used by any space use case that provides a solution for the job. Job profiles may be used both to facilitate system/building design by guiding creation of space use cases and for online run-time control to guide consistent execution of space use cases for the corresponding job. A job profile may define relationships with one or more related and/or dependent jobs. As described in further detail below, a job profile may be part of a space profile, including master space profiles and instance space profiles. Job profiles may be created, edited, updated, removed, added, etc. without intervention from expert users or software developers.

A job step profile captures a solution agnostic specification of a job step and may be used by any space use case that provides a solution for the job step. Job step profiles may be used both to facilitate system/building design guiding creation of space use cases and for online run-time control to guide consistent execution of space use cases for the corresponding job step. A job step profile may contain one or more space use cases that may be used to complete the job step.

The space use case design tool 106 is configured to facilitate design, creation, and editing of space use cases (e.g., by a space use case designer). For example, the space use case design tool 106 may provide one or more graphical user interfaces that allow a user to input a design of a space use case and may generate a space use case profile based on the user input design. This tool may hide complexity of domain-specific operations such that designers/creators/managers/etc. of the space use cases do not need deep domain-specific knowledge. For example, such designer need not be a Controls Specialist, Fire Technician, Security Technician, IT Analyst, Master Integrator, etc. in order to design/create/manage space use cases.

A space use case profile characterizes a space use case and may facilitate the seamless execution of a job or job step across all building domains, business systems, and specialty systems for a space. Space use case profiles may unify use case solutions around the space to enable coordination, conflict resolution, and execution for the space. Space use case profiles hide complexity of domain-specific operations so that users (e.g., designers, creators, managers) of space use case profiles do not need deep domain-specific knowledge. In some embodiments, space use case profiles may have an open framework (e.g., open data model, open software, software development kit, etc.) that allows third parties to create space use cases. Space use case profiles may rely on other information, logic, data, etc. available in a corresponding space profile, for example relating to the design and operation of the space (e.g., identification of the equipment/technology available in the space, available triggers/sensor points, available business or specialty systems) and/or identification of job profiles and job step profiles for the space. Accordingly, space use case profiles are associated with space profiles that characterize spaces and identify devices, equipment, sensors, etc. for the space.

Space use case profiles may identify one or more triggers that may start execution of the corresponding space use case. For example, a space use case profile for "Prepare Conference Room" may be triggered by someone unlocking the space by swiping an ID card and/or by occupancy detection at the start of a scheduled meeting. Triggers may be environment-related (e.g., sensor-detected conditions such as light levels, temperature, occupancy), system related (e.g., outputs of other space use cases), and/or human related (e.g., user interaction with a user interface device). A space use case profile may also identify other inputs that may be used for use case execution (e.g., measurements such as air temperature, historical weather data, data from other space use cases).

Space use case profiles may be added, updated, and/or removed in one or more of the following ways in various embodiments: Space use case profiles may be added, updated, and/or removed at the space use case level (i.e., by directly editing a space use case profile). Space use case profiles may also be added, updated, and/or removed at the job step level, for example by adding, updating, or removing a job step profile in a job profile. The space use case profiles associated with the altered job step profile may be altered accordingly. Space use case profiles may also be added, updated, and/or removed at the job profile level, for example by adding, updating, and/or removing a job profile in a space profile. The associated job step profiles and space use case profiles may be altered accordingly.

Because space use cases are solution dependent (i.e., with multiple possible solutions for executing one job step) multiple space use case profiles may be associated with a single job step profile, for example as shown in FIG. 1 and described below. Various space use case profiles may characterize space use cases of varying degrees of automation (e.g., manual, fully automated, combination of manual and automated), luxury (e.g., good, better, best solutions), etc. Various space use case profiles may also be associated with various points of control of the same environmental condition (e.g., a mobile app and a wall panel). Various other factors that may differentiate various space use case profiles for the same job step profile include varying types of people using the system (e.g., varying roles, varying expertise, varying authorizations), various types of business systems and specialty systems (e.g., various scheduling, calendaring, or email systems, a nurse call system), varying technology in a space (e.g., sensors, cameras, equipment, devices, wearable technology), among other possibilities.

The modes design tool 108 facilitates the creation and editing of mode profiles that characterize modes. A mode profile is a data object (e.g., collection of data, computer code, logic, attributes) that defines a mode. A mode describes how a space is designed to operate under specific circumstances that are triggered by environmental events, human events, or system events (e.g., activating a space use case). In contrast to space use cases, a mode specifies particular low-level settings for equipment and devices. Modes may be characterized by unified logic (i.e., for multiple domains such as lighting and HVAC) unified settings (e.g., temperature and lighting setpoints) for the space across multiple domains. Modes may also be characterized by triggers that determine that the mode should be executed or entered into. A mode profile may also define a priority for a mode that may be used to facilitate conflict resolution between multiple active modes for a space. Modes and systems and methods relating to modes are described in detail in U.S. patent application Ser. No. 15/952,214 filed Apr. 12, 2018, incorporated by reference herein in its entirety. In some embodiments, each space use case profile identifies a corresponding mode profile that characterizes a mode that provides execution of the space use case. In some cases, one mode profile may be associated with multiple space use case profiles. The relationship between space use cases and modes (and between space use case profiles and mode profiles) is described in detail below.

The places and spaces design tool 110 is configured to facilitate design and creation of space profiles and place profiles. A space profile characterizes a set of requirements for the design, operation, and use of a space while a place profile characterizes a set of requirements of the design, operation, and use of a place. For the sake of brevity, references to space profiles herein also captures place profiles (e.g., a place profile may be thought of as a type of space profile). Space and place profiles are described in detail in U.S. patent application Ser. No. 15/952,173 filed Apr. 12, 2018, incorporated by reference herein in its entirety.

The modes design tool 108 and the places and spaces design tool 110 may include one or more circuits and/or software applications configured to provide a user (e.g., job designer, space use case designer) with one or more graphical user interfaces that allow the user to design, create, edit, etc. mode profiles and space profiles. The places and spaces design tool 110 and/or the modes design tool 108 may be suitable for use by a space profile designer (e.g., a person knowledgeable in building design, building domains, and space use) to design space profiles and/or mode profiles. In some embodiments, the places and spaces design tool 110 and/or the modes design tool 108 may be suitable for use by spaces applications engineers to develop applications that are available for selection in space profiles and can be used to execute use cases (e.g., applications executable on equipment in a space). Settings, triggers, priority etc. of such applications may be exposed in a user-friendly interface for manipulation by non-expert users of the places and spaces design tool 110 and/or the modes design tool 108.

As illustrated in FIG. 1, the job profiles design tool 102, the job step profiles design tool 104, the space use case design tool 106, the modes design tool 108, and the places and spaces design tool 110 are communicably coupled to a master profiles repository 112. The master profiles repository 112 stores "master" space use case profiles, job step profiles, job profiles, space profiles, place profiles, and/or mode profiles which are independent of particular end-customer design and/or installation. The master profiles repository 112 provides a starting point for profile "instances" that may be used for a particular place or space and/or for a particular customer or other entity.

The job profiles design tool 102 provides job profiles to the master profiles repository 112 and the master profiles repository 112 stores the job profiles. The job step profiles design tool 104 provides job step profiles to the master profiles repository 112 and the master profiles repository 112 stores the job step profiles. The space use case profiles design tool 102 provides space use case profiles to the master profiles repository 112 and the master profiles repository 112 stores the space use case profiles. The modes design tool 108 provides mode profiles to the master profiles repository 112 and the master profiles repository 112 stores the mode profiles. The places and spaces design tool 102 provides space profiles to the master profiles repository 112 and the master profiles repository 112 stores the space profiles.

The master profiles repository 112 may also receive associations between space use case profiles, job step profiles, job profiles, space profiles, place profiles, and/or mode profiles from one or more of the design tools 102-110. In response, the master profiles repository 112 may organize the space use case profiles, job step profiles, job profiles, space profiles, place profiles, and/or mode profiles accordingly, for example as shown in FIG. 1. As shown in FIG. 1, the master profiles repository 112 includes a place profile 114 that includes a space profile 116. The space profile 116 includes multiple job profiles, including Job Profile A 118 and Job Profile Z 120, indicating that a job associated with Job Profile A 118 and a job associated with Job Profile Z 120 may be completed at the space associated with the space profile 116. Each job profile includes multiple job step profiles. For example, Job Profile A 118 includes Job Step Profile A1 122 though Job Step Profile AN 124, indicating that Job Step Profile A1 122 though Job Step Profile AN 124 correspond to job steps that make up the job characterized by Job Profile A 118. Furthermore, each job step profile includes one or more space use case profiles, indicating that multiple solution dependent space use cases are possible for some solution-independent job steps. For example, Job Step Profile A1 122 is shown to include two space use case profiles, while Job Step Profile AN 124 is shown to include one space use case profile. The space profile 118 is also shown to include mode profiles 126 for that space.

The master profiles repository 112 thereby stores a variety of profiles that may be easily selected and retrieved for application in a particular building management system. The design tools 102-110 may be used to add, remove, edit, update, etc. profiles in the master profiles repository 112. It should be understood that the data structure illustrated in the master profiles repository 112 of FIG. 1 is included for illustrative purposes and is not intended to be limiting. Furthermore, although a single place profile 114 and a single space profile 116 are shown in the master profiles repository 112, it should be understood that the master profiles repository 112 may store any number of place profiles, space profiles, job profiles, job step profiles, space use case profiles, and mode profiles in various embodiments.

Figure 2:
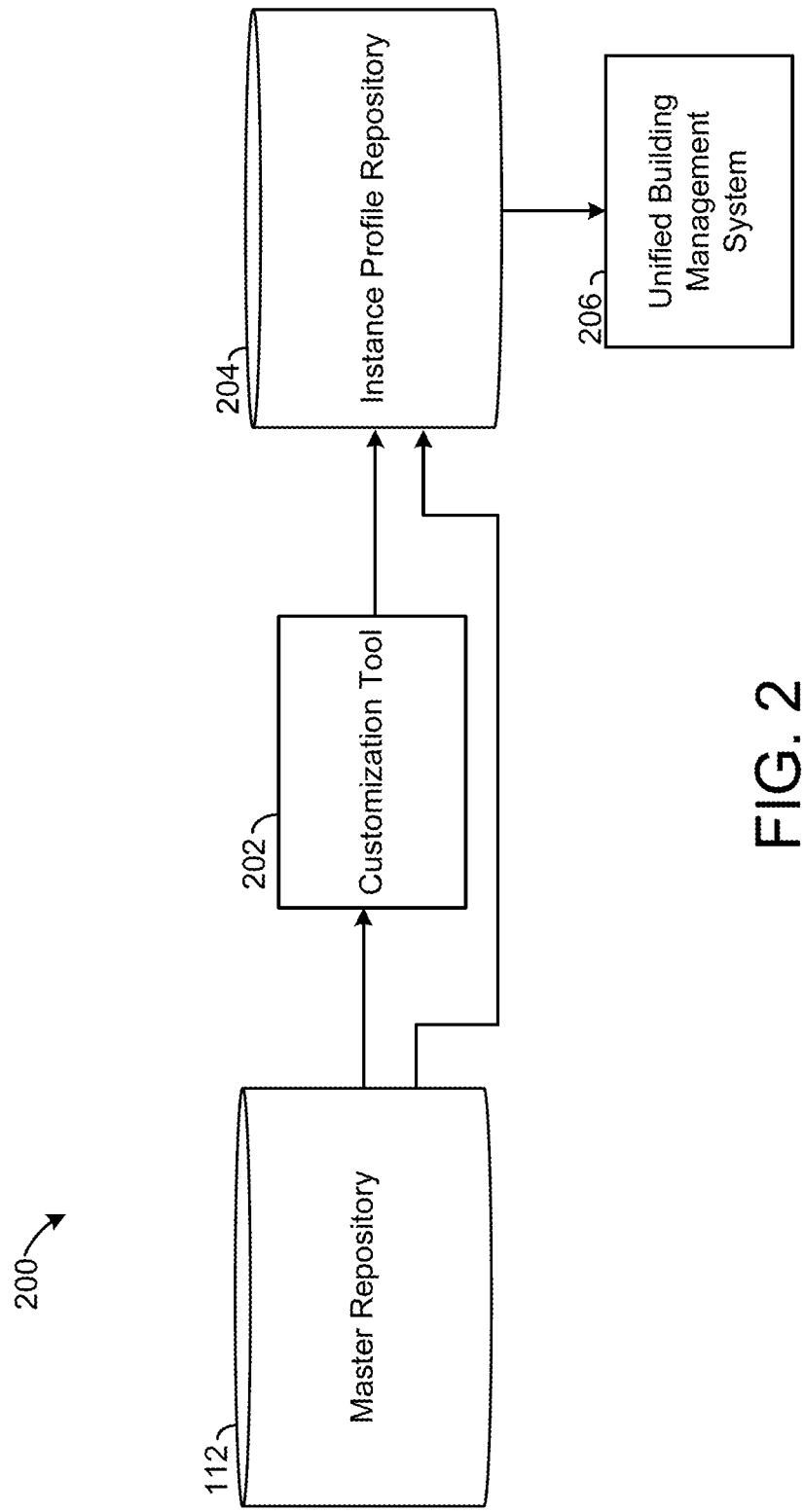
FIG. 2 a block diagram of a system for customizing profiles created and stored in the system of FIG. 1 for application in particular places and spaces and/or to meet the requirements of a particular customer, according to an exemplary embodiment.

Referring now to FIG. 2, a system 200 for customizing master profiles from the master profiles repository 112 for application in particular places and spaces and/or to meet the requirements of a particular customer, according to an exemplary embodiment. The system 200 includes the master profiles repository 112 communicably coupled to a customization tool 202 and an instance profiles repository 204. The instance profiles repository 204 is shown as communicably coupled to an unified building management system 206, indicating that the unified building management system 206 may receive profiles from the instance profiles repository 204.

The customization tool 202 allows a planner designer to select master profiles (e.g., space profiles, job profiles, job step profiles, space use case profiles, mode profiles) from the mater profiles repository 112 and customize the profiles as needed for a particular place, space, building management system, customer, etc. The planner designer may be directed by a seller that works closely with a buyer/customer to determine the customer's needs for a place, determine the jobs and job steps to be completed in the space, the types of solutions (i.e., space use cases) suitable for the customer and the place, etc. The planner designer (e.g., using the customization tool 202) may then identify a bundle (i.e., kit) of profiles from the master profiles repository 112 to offer to the customer/buyer that may satisfy the customer's needs. For example, in a case where multiple space use case profiles are included in a master job step profile, the customization tool 202 may allow the planner designer to select one of the multiple space use case profiles to be used for that place/customer. Pricing may be based on the contents of the bundle. Bundles (kits) may be purchased to address particular outcomes for select space types and may determine which space profiles are used from the master profiles repository 112 for that place/customer. In some cases, the planner designer may select the outcomes the customer wants to achieve to create an appropriate bundle without specifying particular space profiles.

The customization tool 202 may facilitate the planner designer in accessing and copying the profiles in the bundle from the master profiles repository 112. The customization tool 202 may also facilitate the planner designer in altering any profile or element thereof to further tailor the profiles to the needs of a particular place and/or customer. The customization tool 202 thereby facilitates the creation of "instance" profiles. The customization tool 202 provides the instance profiles to the instance repository 204 for storage therein. In some embodiments, as illustrated in FIG. 2, the customization tool 202 may be skipped such that profiles from the master profiles repository 112 may be directly transferred to the instance profile repository 204.

The instance profiles (e.g., space profiles, job profiles, job step profiles, space use case profiles, mode profiles in the instance profiles repository 204) may then be installed for use in online control of spaces and places. In the example of FIG. 2, the instance profiles repository 204 is communicable with a unified building management system 206 to facilitate installation/implementation of the instance profiles in the unified building management system 206. The unified building management system may be a collection of equipment, devices, sensors, controllers, etc. across building domains, specialty systems, and business systems, for example as described in U.S. Provisional Patent Application 62/636,504 filed Feb. 28, 2018, incorporated by reference herein in its entirety. It should be understood that while FIG. 2 shows a unified building management system 204, the profiles, framework, and related systems and process described herein may also be applied to various other building management systems, building equipment, etc.

In various embodiments, space profiles, job profiles, job step profiles, space use case profiles, mode profiles may be installed on various devices, equipment, sensors, controllers, networks, etc. of the unified building management system 206. The system 200 may also facilitate troubleshooting, configuration, verification, and validation to ensure that use cases execute successfully in online control. In some embodiments, profiles may be added, removed, edited, updated, etc. on the unified building management system 204 during online use. Instance profiles may be plug-and-play such that instance profiles can be installed on the unified building management system 206 without expert intervention. Various devices, equipment, sensors, controllers, networks, etc. of the unified building management system 206 may then be controlled and/or operated in accordance with the profiles to provide space use cases and facilitate execution of jobs and job steps at spaces and places.

Figure 3:
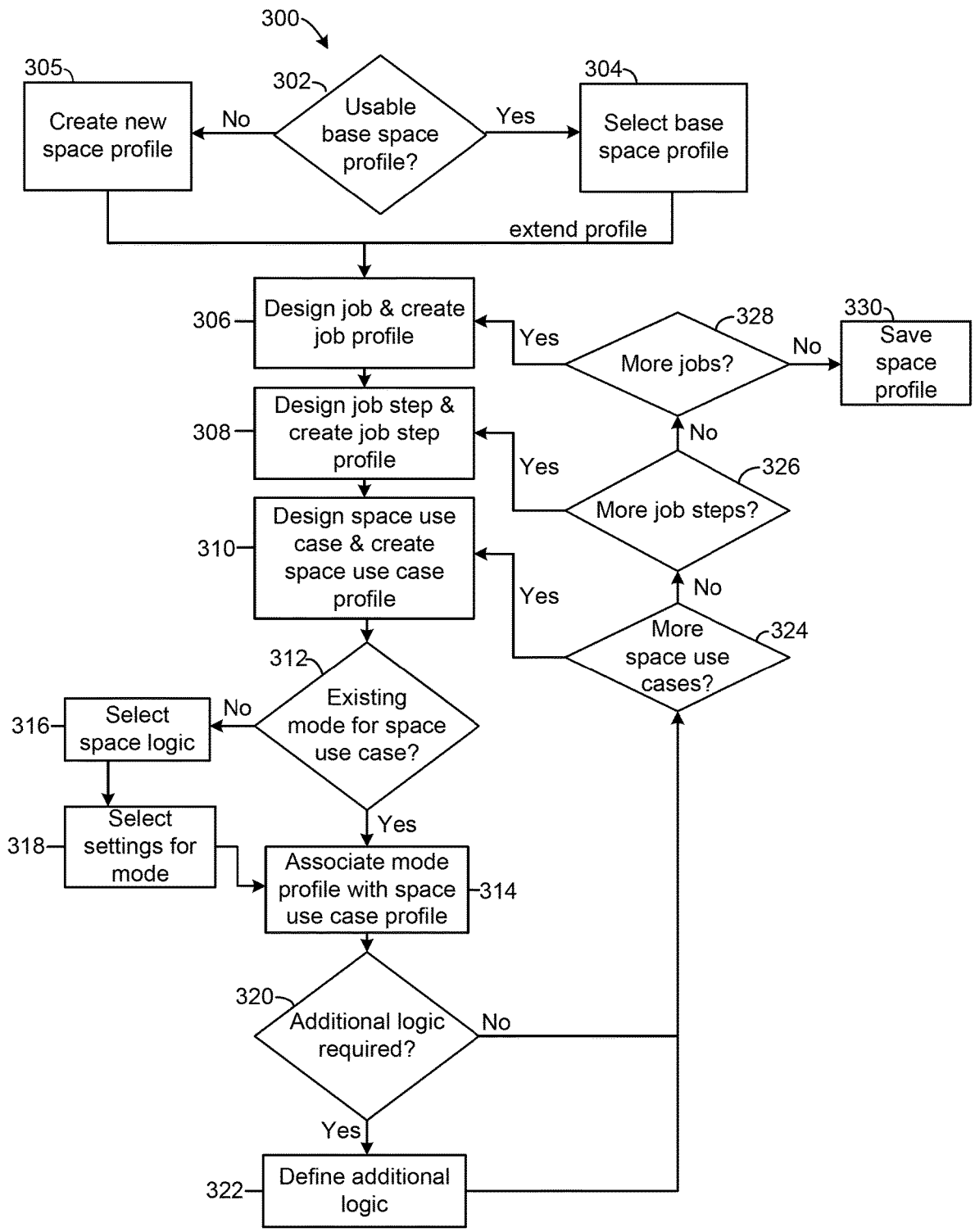
FIG. 3 is a flowchart of a process for creating job profiles, job step profiles, space use case profiles, mode profiles, space profiles, and place profiles, according to an exemplary embodiment.

Referring now to FIG. 3, a flowchart of a process 300 for creating space profiles is shown, according to an exemplary embodiment. Process 300 may be carried out using the design tools 102-110 of FIG. 1 in communication with the master profiles repository 112 and/or the instance profiles repository 204.

At step 302, a determination is made regarding whether a usable base space profile is already stored by the master profiles repository 112. A usable base space profile may be a space profile with similar characteristics as a new space profile to be created using process 300 that may be edited, added to, updated, modified, extended, etc. to create a new space profile. If a usable base space profile is available, at step 304 that space profile is selected for modification in process 300. That is, a copy of base space profile may be made from the master profiles repository 112 to serve as a starting point for a new space profile at step 306 and the remainder of process 300. If no useable base space profile is available, at step 305 a new space profile may be created by a user for modification/design/etc. in the remainder of process 300.

At step 306, a job is designed and a job profile for that job is created. For example, the job profiles design tool 102 may provide a user with a graphical user interface that allows the user to define a job. The job profiles design tool 102 may receive the user input and generate a job profile based on the user input. A job is thereby designed and a corresponding job profile created. In some embodiments, in alternative to creating a new job or job profile, an existing job profile may be selected from the master profiles database 112 at step 306.

At step 308, a job step is designed for the job designed at step 308. A job step profile is created and included in the job profile created at step 306. For example, the job step profiles design tool 104 may profile a user with a graphical user interface that allows the user to define a job step. The job step design tool 104 may receive the user input and generate a job step profile based on the user input. A job step is thereby designed and a corresponding job step profile created that facilitates execution of the job designed at step 306. In some embodiments, in alternative to creating a new job step or job step profile, an existing job step profile may be selected from the master profiles database 112 at step 308.

At step 310, a space use case is designed that corresponds to the job step designed at step 308. A space use case profile is created and included in the job step profile designed at step 308. For example, the space use case design tool 106 may provide a user with a graphical user interface that allows the user to define a space use case. The space use case design tool 106 may receive the user input and generate a space use case profile based on the user input. A space use case is thereby designed a corresponding space use case profile created that facilitates execution of the job step designed at step 308 and the job designed at step 306. In some embodiments, in alternative to creating a new space use case or space use case profile, an existing space use case profile may be selected from the master profiles database 112 at step 310.

At step 312, a determination is made regarding whether an existing mode exists that may be used to execute the space use case designed at step 310. The master profiles repository 112 may store multiple mode profiles that characterize a variety of modes that may be selected and associated with various space use cases. For example, basic and/or generic modes (e.g., generic room control with occupancy settings) may be developed in advance. In such a case, process 300 may proceed to step 314 where the pre-defined mode (i.e., an existing mode profile) may be associated with the space use case profile created at step 310. In preferred embodiments, each space use case profile is associated with a single mode profile.

Figure 4:
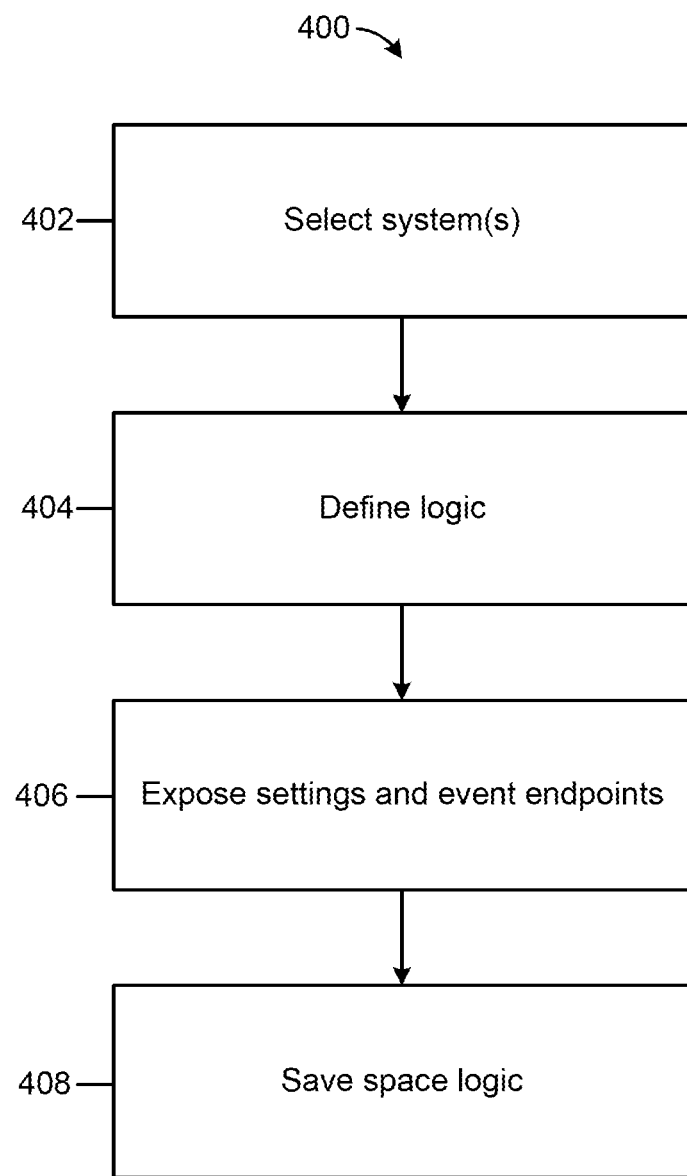
FIG. 4 is a flowchart of a process for creating space logic, according to an exemplary embodiment.

In some cases, a space use case may require the development of new space logic and/or the addition of a new mode. In such a case, no existing mode exists for the space use case and the process 300 proceeds from step 312 to steps 316 and step 318 where a new mode is created. At step 316, a user selects space logic for the new mode. In some cases, the space logic may be selected from a repository of pre-defined space logics. In some such cases, the space logic may be presented to a user as a black box, such that a user need only interact with configuration, trigger, and priority endpoints, for example. In some cases, a user may desire to define new space logic. A process 400 for defining space logic is shown in FIG. 4 and described in detail with reference thereto. In some embodiments, space logic may be created automatically by the mode profiles design tool 108 based on one or more space use case profiles.

At step 318, settings for the new mode are selected. The relevant settings may be defined by the space logic selected at step 316. In some embodiments, the mode profiles design tool 108 generates a graphical user interface that provides the user with settings fields that allows a user to define settings for the mode (e.g., temperature setpoints, lighting levels, trigger conditions, etc.) without requiring software development or building domain expertise. The mode profiles design tool 108 may create a mode profile based on the user input. In some embodiments, modes may be created automatically by the mode profiles design tool 108 based on one or more space use case profiles. At step 314, the new mode profile may then be associated with the space use case profile created in step 310. The mode profile may also be stored independent of the space use case profile in the master profiles database 112.

In some cases, there may be a need to augment modes with additional logic. Accordingly, at step 320, a determination is made regarding whether additional space logic is desired and/or required. If a user desires to add additional space logic, the space logic may be added to the space profile at step 322, for example as a collection of settings or as an application. For example, in some cases additional logic may be required to facilitate interoperability with business systems and/or specialty systems involved with the job profile, job step profile, space use case, or mode.

At step 324, a determination is made regarding whether more space use cases are desired and/or needed for the job step designed at step 308. As noted above, various solution-dependent space use cases may be possible for each job step. Accordingly in some cases a user may desire to create multiple space use case profiles for one job step profile. If so, process 300 returns to step 310 where another space use case may be defined and a corresponding space use case profile created.

If no more space use cases will be defined, process 300 proceeds to step 326 where a determination is made regarding whether more job steps are desired and/or required for the job defined at step 306. For example, when a job is intended to be made up of multiple job steps the process 300 may return to step 308 several times so that the multiple job steps can be defined and corresponding job step profiles created.

If no more job steps will be defined, process 300 proceeds to step 328 where a determination is made regarding whether more jobs are desired and/or required for the space. A space may be associated with any number of jobs (i.e., a space profile may include any number of job profiles). Accordingly, in some cases the process 300 returns to step 306 where another job is designed and a corresponding job profile is created.

It should be understood that the steps of process 300 are optional and that various steps can be executed and/or skipped to allow a user to design/customize and/or not design/customize various profiles and modes. Process 300 is therefore highly configurable and flexible to adjust to any desired combination of design and customization steps in concert with use of pre-created space, job, job step, space use case, and mode profiles.

Once all desired and/or required jobs, job steps, and space use cases are designed for the space and corresponding profiles are created, the space profile is saved in the master profiles repository 112 and/or the instance profiles repository 204. That is, the job profiles, job step profiles, space use case profiles, and mode profiles created and/or selected during process 300 may be collected in a space profile and stored in master profiles repository 112 and/or the instance profiles repository 204. The new space profile may then be selected for installation and online use.

Referring now to FIG. 4, a process 400 for creating space and cross-space logic is shown, according to an exemplary embodiment. At step 402, a designer may select one or more systems, for example an HVAC system, a lighting system, a security system, a specialty system, a business system, etc. At step 404, the designer may define logic for the control of the selected system(s). For example, the logic may define input points (e.g., physical measurements, user inputs, etc.) and one or more algorithms or rules that determine outputs (e.g., control signals) based on the input points. At step 406, various settings, event endpoints, and/or other parameters of the logic are exposed. In other words, while the logic may be defined in a computer-programming language, various settings, event endpoints, and/or other parameters may be implemented in such a way that they can be easily modified in a user-friendly graphical user interface without knowledge of the programming language or other software development expertise. At step 408, the space logic is saved, for example in a space profile in the master profiles repository 112.

Figure 5:
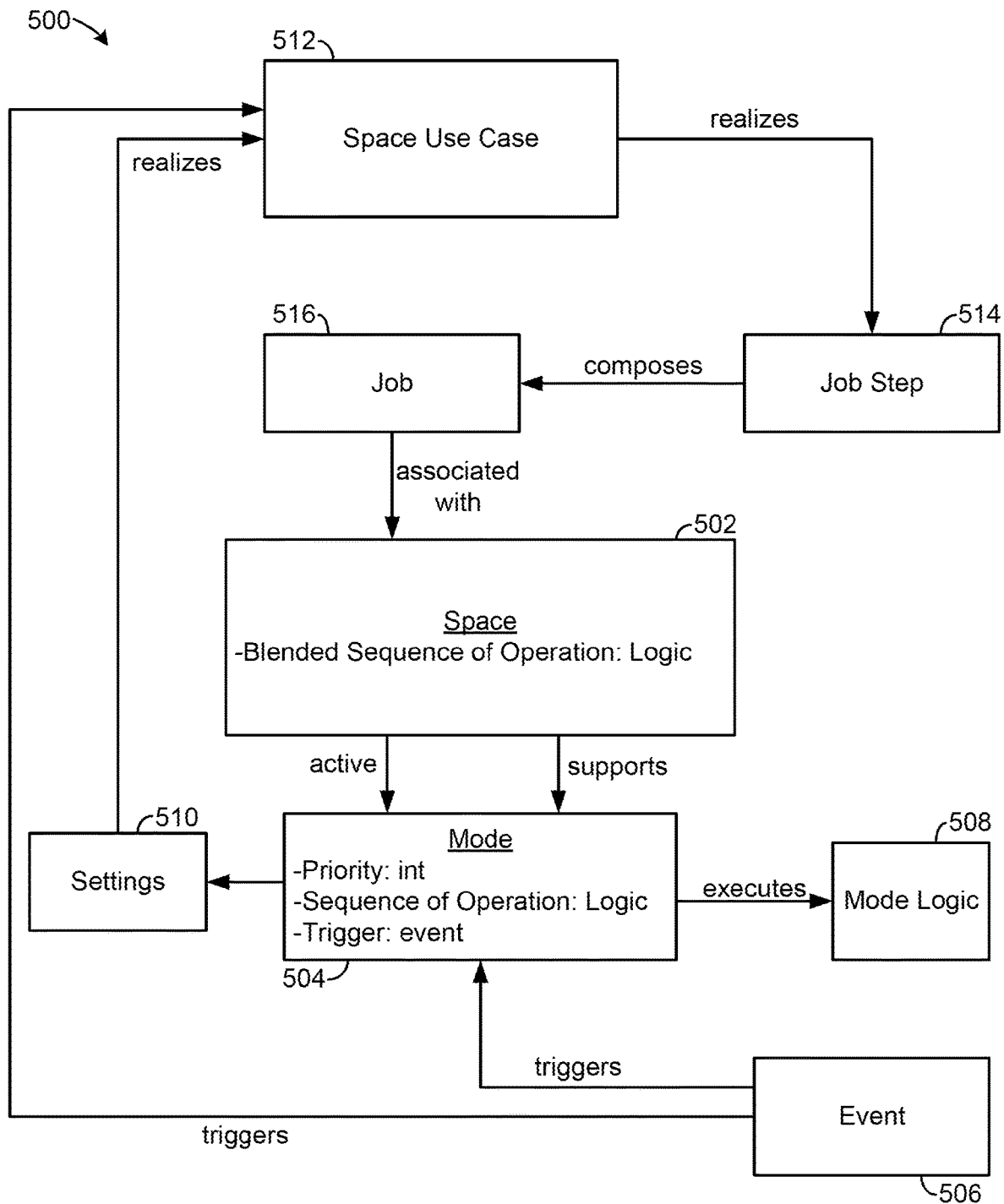
FIG. 5 is a diagram of relationships between spaces, jobs, job steps, space use cases, modes, settings, mode logic, and events, according to an exemplary embodiment.

Referring now to FIG. 5, a diagram 500 illustrating the relationships between spaces, jobs, job steps, space use cases, modes, settings, mode logic, and events is shown, according to an exemplary embodiment. The diagram 500 may illustrate relationships, profiles, and logic defined using process 300 and/or process 400. The diagram 500 may illustrated relationships, profiles, and logic created by design tools 102-110 and/or stored in the master profiles repository 112 and/or the instance profiles repository 204.

As illustrated by FIG. 5, a space 502 supports any number of modes 504. The modes 504 may be associated/dropped into the space 502. Each mode 504 has priority (e.g., an integer value), logic (e.g., software code), and a trigger (e.g., an event). When dropped/associated into the space 502, each mode 504 becomes operational but not necessarily active until the mode 504 is activated/triggered by an event 506. When triggered by an event 506, the mode 504 executes mode logic 508 and provides settings 510 that realize a space use case 512. Accordingly, the event 506 may be seen as triggering the space use case 512. The space use case 512 realizes a job step 514 that may be among multiple job steps 514 associated with a job 516. The job 516 is associated with the space profile 502.

In some embodiments, modes 504 may be temporarily disabled to prevent interference with special user activities. Disabling a mode can be a simplifying alternative to over-proliferating modes. For example, temporarily disabling an "unoccupied mode" may be a way to keep a room in an "occupied mode" for maintenance and repairs or to maintain comfort levels during short periods of absence.

In some embodiments, multiple space use cases 512 may be simultaneously active, for example as a result of multiple trigger events 506. The execution of all active space use cases 512 may be coordinated in determining when and how to engage low level logic of each building domain, for example to resolve any conflicts that may arise between simultaneously active space use cases 512. In various embodiments, prioritization, coordination, conflict resolution, etc. is performed at the space use case level, the job level, the job step level, the mode level, and/or a combination thereof. Conflict resolution and coordination may therefore be achieved at these higher levels in the framework as opposed to at the lowest level of control logic for equipment and devices.

For example, in some embodiments, a space profile 502 may include an ordered series of space desired outcomes that facilitate coordination and conflict resolution (e.g., a patient room first needs to be clean, then comfortable). These preferences may be based on user-defined rules or algorithms or artificial intelligence approaches such as machine learning. In some embodiments, the prioritization strategy may be easily changed by a user at any time (e.g., by selecting between an "energy savings" strategy and a "comfort" strategy). In some embodiments, certain priorities may be locked, for example to prevent a fire emergency use case from being set to a low priority by mistake or maliciously. In some embodiments, priority may be assigned to various people and space use cases may be prioritized based on who is involved with executing or requesting a space use case. For example, a set of space use cases associated with a nurse may have a higher priority and therefore override space use cases associated with a patient. In some embodiments, plug-and-play conflict resolution modules may be applied to update, add, or otherwise alter conflict resolution rules, algorithms, machine learning, etc. without the intervention of expert users or software developers.

In some embodiments, the space profile 602 may be aware of related spaces and related space use cases 512 that are active or have been active. For example, each space profile 602 may be aware of relationships between multiple spaces in a places. These relationships may include physical aspects (e.g., relative locations of spaces) as well as other information that provides an understanding of what is going on in those spaces (e.g., what assets are in those spaces, what the related spaces are, what space use cases have occurred or are occurring in the related spaces). For example, a person in a conference room may need to find the nearest portable A/V equipment located in another space. As part of a "find A/V equipment" conference room use case, the person can be directed to the closest space (conference rooms, equipment closet, etc.) where the portable A/V equipment is not in use, based on space use case activity in those spaces. As another example, a person in a research lab may need to find the nearest portable spectrophotometer located in another space. As part of the "find lab equipment" use case the person may be informed that all portable spectrophotometers are in use based on the space use case activity and lab inventory. The space use case will also inform the person which spectrophotometer is likely to free up the soonest using predictive analytics based on the historical space use case activity. As another example, the history of what space use cases were most and least active per space could help property managers understand how occupants are using the spaces. If over time there is high activity with some space use cases they may want to do preventive maintenance sooner on assets related to those use cases (either the assets that people are using or assets that provide environment conditions for the space use cases). However, if the property managers find that there is low or no activity with some space use cases, a determination may be made that there is an issue with the assets people are using, that the assets could be repurposed to another space, or that the space itself could be repurposed. Accordingly, space use case history may be one piece of space data that may be fed into analytics to provide predictive preventive maintenance and space utilization recommendations.

Figure 6:
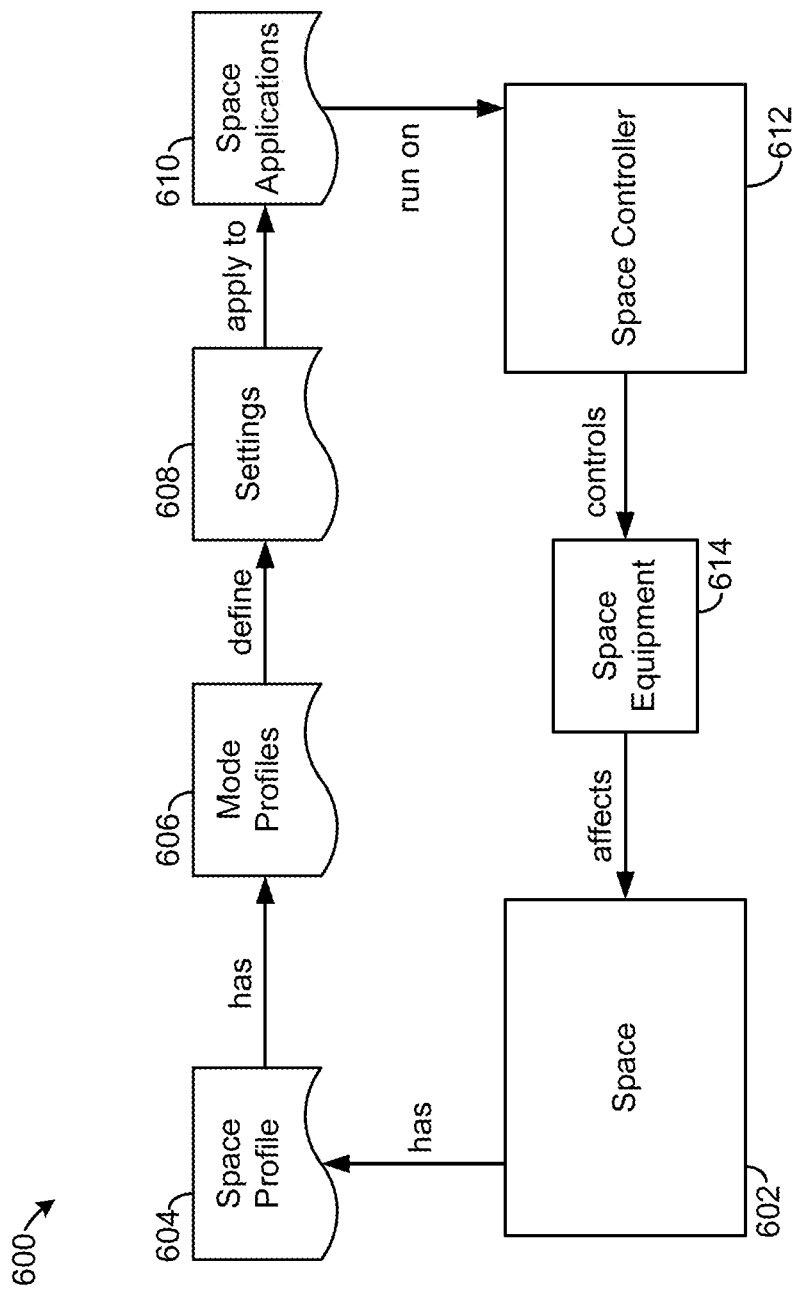
FIG. 6 is an illustration of a space application path, according to an exemplary embodiment.

Referring now to FIG. 6, an illustration of a space profile application path 600 is shown, according to an exemplary embodiment. The space profile application path 600 is a representation of online control based on the space use case framework described herein. As illustrated in FIG. 6, a space 602 has a space profile 604. The space profile 604 has one or more mode profile 606 that define settings 608. The settings 608 apply to space applications 610 for the space (e.g., a space application 610 for each mode 606). The space applications 610 run on a space controller 612 (i.e., space applications 610 are executed by a processor of a space controller 612). The space controller 612 is communicably and operably coupled to space equipment 614 and controls the space equipment 614 by executing the space applications. The space equipment 614 is controlled to affect one or more environmental and/or physical conditions of the space 602. Accordingly, steps 610-614 illustrate an example of how a space use case may be realized. That is, steps 610-614 are one way to create the "realizes" link between the settings 510 and the space use case 512 in FIG. 5. The space profile application path 600 thereby forms the loop shown in FIG. 6.

As used herein, "space controller" may refer to any combination of circuitry, software components, hardware components (e.g., memory components, processing components) etc. configured to performed the disclosed functions. A space controller may be a device positioned locally at a space or place, may manage one or more spaces or places, may be distributed across various computing devices, may be hosted on a remote server and/or cloud computing resource, etc. Accordingly, it should be understood that the space controller is highly configurable according to various embodiments.

Figure 7:
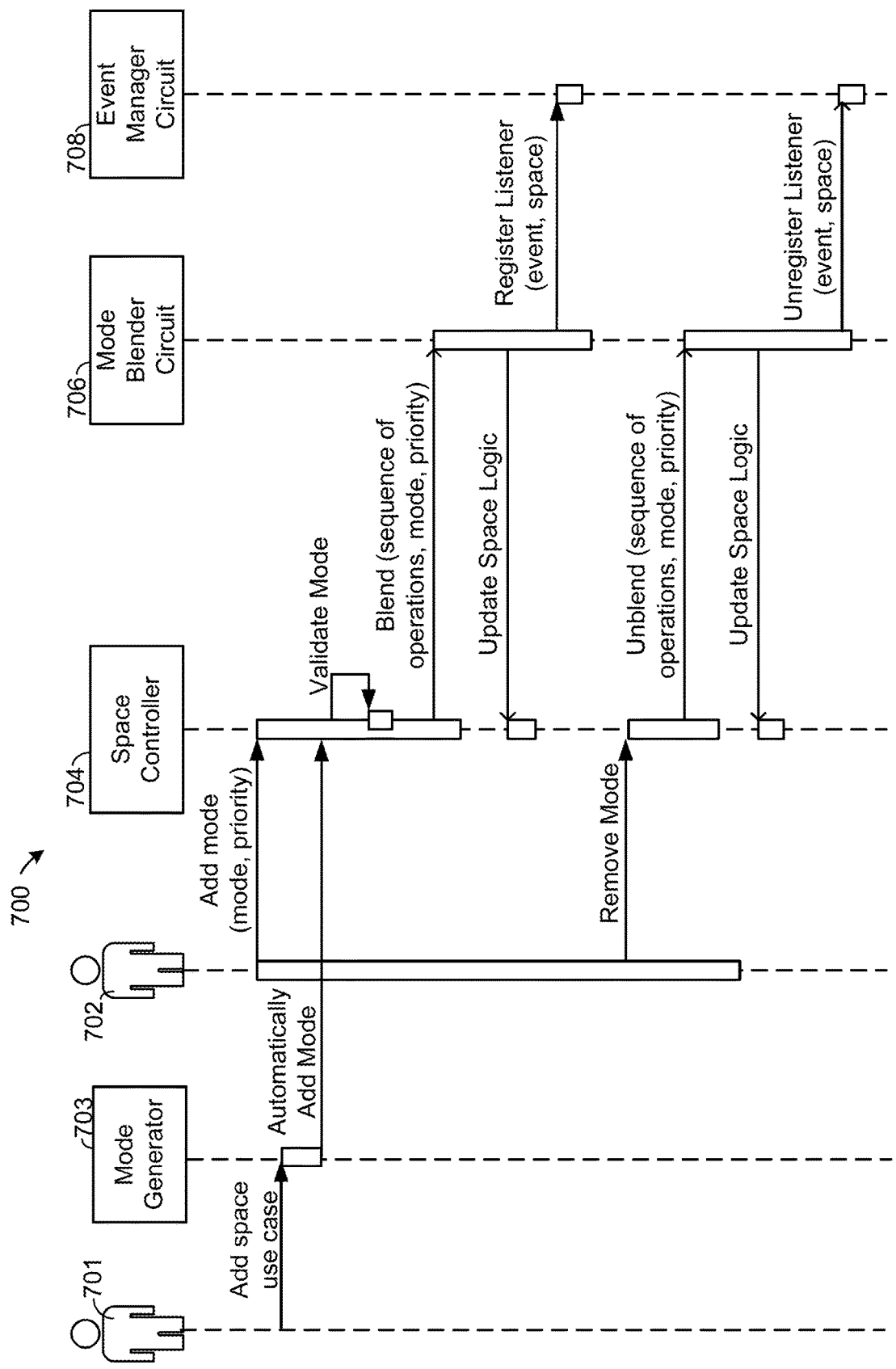
FIG. 7 is an illustration of a process for managing modes, according to an exemplary embodiment.

Referring now to FIG. 7, a diagram 700 illustrating a process for managing modes is shown, according to an exemplary embodiment. The diagram 700 shows steps taken by and/or for a user 702, a space controller 704, a mode blender circuit 706, an event manager circuit, with time progressing along a vertical axis from the top of the diagram 700 to the bottom of the diagram 700.

To start, the user 702 (e.g., a system administrator) may add a mode by providing the mode and a priority for the mode to the controller 704. In some cases, a space use case designer 701 adds a space use case to a mode generator 703. The mode generator 703 automatically generates a new mode based on the mode generator and adds the mode to the space controller 704. The space controller 704 may validate the mode and provide the mode to the mode blender circuit 706 for blending with one or more other modes already associated with the space. The mode blender circuit 706 is configured to determine space logic for the space based on a blending of multiple modes, for example as described in detail below. The mode blender circuit 706 provides the updated space logic to the space controller 702, which may use the updated space logic to control systems, equipment, devices, etc. for the space. The mode blender circuit 706 may also register the new mode as a listener with the event manager 708 to provide the event manager 708 with an indication of the trigger for the new mode (i.e., to cause the event manager 708 to monitor for the trigger).

At some point, the user 702 may remove a mode from the space controller 704. The space controller 704 may instruct the mode blender circuit 706 to unblend the removed mode from the other modes for the space. The mode blender circuit 706 may determine updated space logic for the space that does not use the removed mode. The mode blender circuit 706 may provide the updated space logic to the space controller 702, which may use the updated space logic to control systems, equipment, devices, etc. for the space. The mode blender circuit 706 may also communicate with the event manager circuit 708 to unregister the removed mode as a listener, i.e., to cause the event manager circuit 708 to cease monitoring for the trigger associated with the removed mode.

Because modes may be triggered by events (e.g., human events, environmental events) that are not under system control, multiple modes for a space may be active simultaneously. The mode blender circuit 706 may follow a clear strategy to ensure that the system behaves deterministically when multiple modes are actively simultaneously.

In some embodiments, priority may be determined by a runtime function. For example, the following simplified function could be used to set priority between comfort and energy settings (which states that comfort settings have priority if the energy saving metrics are on track, otherwise the energy saving settings take precedence):

```
if (energy_saving_targets == 'on track')
        settings = comfort_settings
else
        settings = energy_saving_settings.
```

In some embodiments, priority is driven by an associated use case outcome. For example, if a mode is associated with a life-threatening safety feature or event, that mode may take precedence over non-life-preserving modes. Various other types of outcomes may be ranked in a similar fashion.

In some embodiments, each mode is explicitly assigned a priority during a design phase. For example, a mode designer may be made aware of all possible modes that can be simultaneously active and explicitly indicate desired system behaviors for each possibility. For example, the mode designer may rank modes on a numerical priority scale (e.g., from zero to thirty). The following example for a patient room is one such example.

In this example, a patient room has multiple space use cases: A patient comfort use case allows the patient to tweak room environment settings for different activities, within preset limits, for example temperature and lights. A clean room pending space use case is applied after a patient is discharged and schedules the room for cleaning. Until the cleaning staff arrives for cleaning, the room is put in a dormant state (lights off, temperature to unoccupied settings). A fire space use case allows the space to react when a fire is started in the building, for example by turning on lights, turning on a strobe light, putting circumstance-dependent evacuation instructions on a display, etc. In traditional systems, these situations have been handled by programming each room control subsystem individually to respond to conditions such as occupancy, schedules or setpoint changes. The systems and methods of the present disclosure, in contrast, organizes the modes together for all domains while accounting for priorities.

In this example, a system administrator may add modes incrementally to be associated with the space use cases outlined above. When a mode is added, the system (e.g., the mode blender circuit 706) may ensure that the mode fits with existing modes, for example by prompting the system administrator to input a priority for the new mode. Accordingly, the result may be the same regardless of the order in which modes are added. The following table provides further details relating to this example:

| Mode | Priority | Triggers | Blending Action |
| --- | --- | --- | --- |
| Base | 0 | NA | This is the basic set of functionalities; the room control performs basic control of temperature, lights, etc. using built-in user interfaces |
| Patient Comfort | 10 | Patient is admitted and enters the room | A software module is added to the room control application that sets the environment to patient preference and allows them to control the environment using their handheld device. The room registers for "Patient Admitted" events |
| Rounds | 20 | Medical staff is doing rounds | A software module is added to the room control application to set environment settings to accommodate the physician rounds and override non-critical settings. The room registers for "Rounds" events. |
| Clean Room Pending | 10 | Patient is discharged | A software module is added to the room control to create cleaning work orders and to set the room condition to dormant in the meantime. Room registers for "Patient Discharged" events |
| Fire | 30 | A fire alarm is triggered elsewhere in the building | A software module is added to the room control that is able to override any existing settings and set the condition to fire evacuation. The room registers for "Fire" events |

Various other modes and priorities are possible in various embodiments. In some cases, modes may be mutually exclusive (e.g., a space may be either occupied or unoccupied but not both). For example, a generic room application is shown in the following table:

| Generic Room Application | Active Mode | |
| --- | --- | --- |
| | Occupied | Unoccupied |
| Temperature Control | Between 71 and 74 deg F. | Between 65 and 85 deg F. |
| Lighting Control | Lights = On | Lights = Off |

In other cases, modes are cumulative. For example, an occupied mode can be considered a base whose settings can be overridden or extended by other concurrent modes (e.g., a conversation mode or presentation mode). An example of such a case is shown in the following table:

| | Active Mode | | |
|---|---|---|---|
| Generic Room | Occupied | | |
| Application | Conversation | Presentation | Unoccupied |
| Temperature Control | 72.5 +/− 1.5 deg F. | | 70 +/− 5 deg F. |
| Lighting Control | Lights = 100% | Lights = 20% | Lights = Off |
| Audio Video Control | Off | On | Off |

In some cases, applicable modes may be selected from a list of available modes based on the space profile. In some embodiments, modes may designed and developed independently from spaces and assigned priorities. An example of such a case is shown in the following table:

| | | | Control System | | |
|---|---|---|---|---|---|
| Mode ID | Mode Name | Default Priority | Temperature Control | Lighting Control | AV Control |
| M1 | Occupied | 10 | 72.5 +/− 1.5 deg F. | Lights = 100% | Unspecified |
| M2 | Unoccupied | 10 | 70 +/− 5 deg F. | Lights = 0% | Unspecified |
| M3 | Presentation | 20 | Unspecified | Lights = 20% | On |
| M4 | Conversation | 20 | Unspecified | Lights = 100% | Off |

Figure 8:
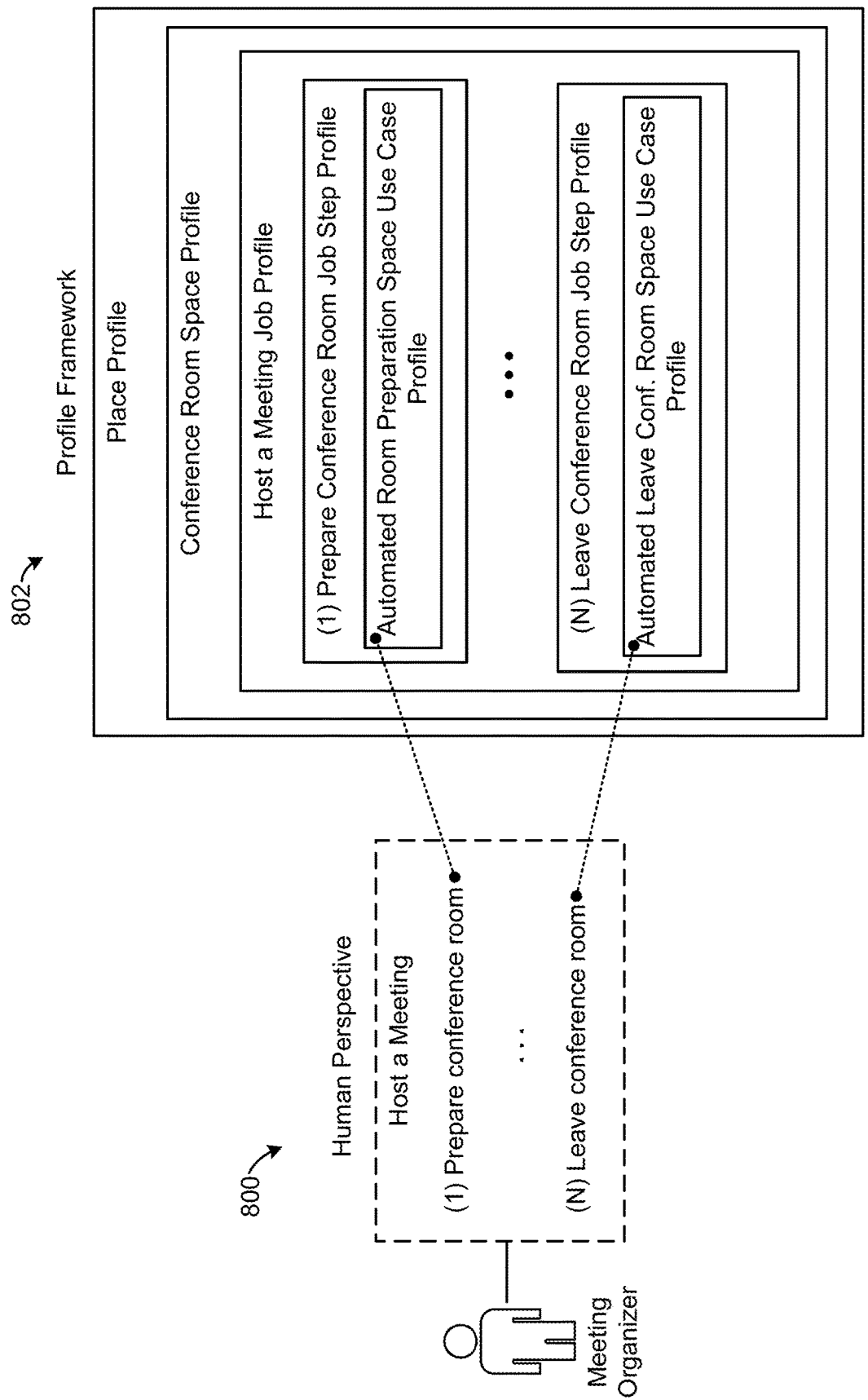
FIG. 8 is an illustration of a first example of a space profile with a job profile, job step profiles, and space use case profiles, according to an exemplary embodiment.

Referring now to FIG. 8, an illustration of a first example of how the framework, systems, and methods described herein may facilitate completion of a job at a space is shown, according to an exemplary embodiment. In the example of FIG. 8, the space is a conference room and the job is to host a meeting. FIG. 8 includes a block 800 that indicates how a human user may conceptualize the job of hosting a meeting at the conference room. FIG. 8 also includes a block 802 that shows how the job is organized into a place profile, space profile, job profile, multiple job step profiles, and multiple space use case profiles in the present embodiment.

The following tables characterize the advantages of the approach shown in block 802 and described herein as compared to traditional approaches to managing buildings:

| Job Step | | Building Systems Today | BMS with Space Use Case Framework | Space Modes |
|---|---|---|---|---|
| 1 | Prepare conference room | The Meeting Coordinator: Unlocks the door by badging in using the access control system. Turns on lights by pressing the light switch. Notices it is hot in the room so uses the thermostat to turn down the set point. Turns on the A/V monitor for presenting. Other job steps not shown. | Event: Meeting Coordinator unlocks the door by badging in using the access control system. Action: This triggers the space use case associated with "Prepare conference room" job step to turn on the lights, start cooling the room, and turn on the A/V monitor. | Conference Room Mode(s) = unoccupied ↓ Conference Room Mode = occupied Conference Room Mode = occupied |
| N | Leave conference room | Everyone leaves conference room 50+ minutes before the scheduled meeting end, because a critical attendee did not show | Event: Everyone leaves conference room 50+ minutes before the scheduled meeting end. Action: This triggers the space use case associated | Conference Room Mode = occupied ↓ Conference Room Mode = unoccupied |

| Job Step | Building Systems Today | BMS with Space Use Case Framework | Space Modes |
|---|---|---|---|
| | up.<br>The Meeting Coordinator should (but may not always) Free up the conference room by canceling the reservation or rescheduling the meeting in the conference room management system.<br>Turn off lights by pressing the light switch.<br>Turn up the set point by using the thermostat.<br>Turn off the A/V monitor. | with "Leave conference room" job step to turn off the lights, raise the room set point, turn off the A/V monitor, and free-up the room in the conference room booking system after X minutes of no one returning. | |

| Conference Room | Settings | |
|---|---|---|
| Mode | Occupied | Unoccupied |
| Temperature Control | 72.5 +/− 1.5 deg F. | 70 +/− 5 deg F. |
| Lighting Control | Lights = 100% | Lights = Off |
| Audio Video Control | On | Off |

Figure 9:
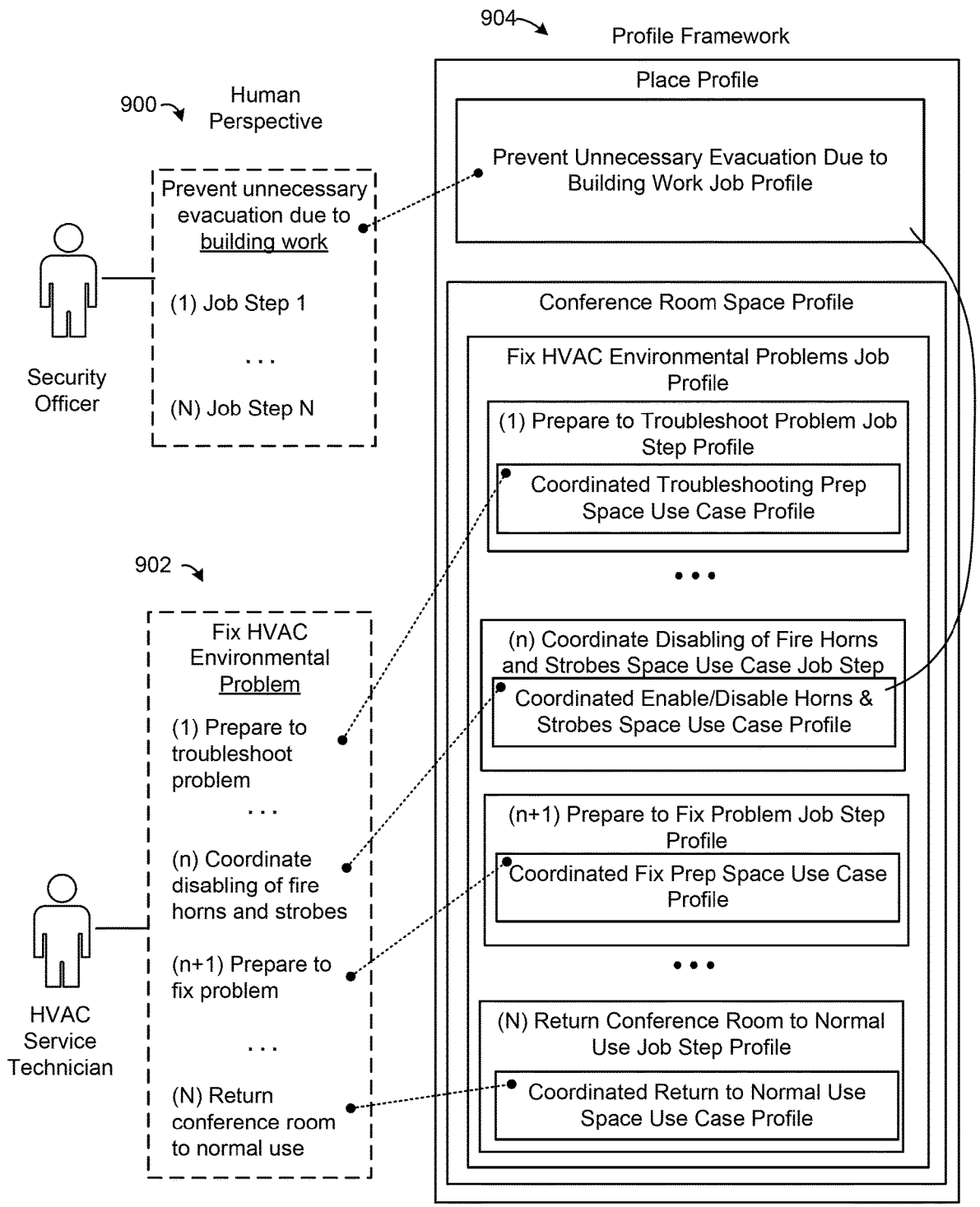
FIG. 9 is an illustration of a second example of a space profile with a job profile, job step profiles, and space use case profiles, according to an exemplary embodiment.

Referring now to FIG. 9, an illustration of a second example of how the framework, systems, and methods described herein may facilitate completion of a job at a space or place is shown, according to an exemplary embodiment. In the example of FIG. 9, the space is a conference room and the job is to fix an HVAC environmental problem in the conference room. As shown in FIG. 9, completing this job includes both a security officer and a HVAC service technician. FIG. 9 includes a block 900 that indicates how the security officer may conceptualize the job of fixing an HVAC environmental problem in the conference room. FIG. 9 also includes a block 902 that indicates how the HVAC security technician may conceptualize the job of fixing an HVAC environmental problem in the conference room. FIG. 9 further includes a block 904 that shows how the job is organized into a place profile, space profile, job profile, multiple job step profiles, and multiple space use case profiles in the present embodiment.

The following tables characterize the advantages of the approach shown in block 902 and described herein as compared to traditional approaches to managing buildings:

| Job Step | | Building Systems Today | BMS with Space Use Cases | Space Modes |
|---|---|---|---|---|
| 1 | Prepare to troubleshoot problem. | The HVAC Service Technician:<br>Changes the status of the work order to "Troubleshooting" in the work order management system.<br>Gathers data for troubleshooting from the HVAC System.<br>Requests access to the conference room through the access control system. | Event: The HVAC Service Technician changes the status of the work order to "Troubleshooting" in the work order management system.<br>Action: This triggers the space use case associated with "Prepare to troubleshoot the problem" job step to automatically gather and present diagnostic information and request access to the conference room for the HVAC Service Technician. It also makes the room unavailable for reservation until it in released (which can be done automatically when the problem is resolved or manually if the rooms is partially usable) | Conference Room Mode = Unoccupied<br>↓<br>Conference Room Mode = Diagnostic |
| | | Other job steps not shown include . . .<br>Troubleshooting the problem.<br>Applying a workaround to make the environment as comfortable as possible until the problem can be fixed, which involves overriding values in the HVAC system as a work-around. | | |
| 2 | Coordinate disabling | The HVAC Service Technician: | Event: The HVAC Service Technician issues a | Conference Room Mode = Diagnostic |

| | | | | |
|---|---|---|---|---|
| | of fire horns & strobes. | Coordinates the disabling of fire horns & strobes with Security Officer, because the fix requires "hot work" that might set off the fire system causing a building evacuation. Note: A Security Officer has a related job which includes a step to disable the fire horns and strobes and monitor the fire system at this time. The Security Officer will determine, based on the information provided by the HVAC Service Technician, what devices need to be disabled and what he will need to manually monitor while the horns & strobes are offline. Furthermore, the Security Officer will rely on the HVAC Service Technician to communicate any changes directly (ex: change to date/time of fix). | dependent work order to disable the fire horns & strobes which triggers a place use case for the Security Officer. Action: The work order is automatically populated with the space that is being impacted, the time and date of the HVAC fix, person doing the fix (with contact information), the related fire devices (determined by the system), etc. In addition, any changes in the work order (ex: fix will be done sooner) will be automatically received by the Security Officer. | ↓ Conference Room Mode = Hot Repair Preliminary |
| 3 | Prepare to fix problem. | The HVAC Service Technician: Changes the status of the work order to "Fix in Progress" in the work order management system. Changes the status of the conference room to unavailable in the conference room management system. Verifies fire horns and strobes are disabled in the fire system. Disables alarms for HVAC equipment related to the fix in the HVAC system. Takes HVAC equipment offline in the HVAC system. Overrides lighting schedule to keep lights on during the fix in the lighting system. | The HVAC Service Technician changes the status of the work order to "Fix in Progress" in the work order management system. This triggers the space use case associated with "Prepare to fix the problem" job step to determine what is involved in the fix (ex: through the work order management system) and then take the following actions. Verify fire horns and strobes are disabled (inform the HVAC Service Technician and Security Officer if they are not). Disable alarms for the equipment related to the fix and take the equipment offline. Ensure the lights stay on in the conference room while the fix is in progress. | Conference Room Mode = Hot Repair Preliminary ↓ Conference Room Mode = Hot Repair Active |
| | | Other job steps not shown, including fixing the problem. | | |
| N | Return conference room to normal use. | The HVAC Service Technician: Changes the status of the work order to "Completed" in the work order management system. Enables alarms for HVAC equipment related to the fix in the HVAC system. Brings the HVAC equipment back online in the HVAC system. Returns HVAC to programmed operation (i.e. release overrides) in the HVAC system. Returns lighting to scheduled operation in the lighting system. Changes the status of the | The HVAC Service Technician changes the status of the work order to "Completed" in the work order management system. This triggers the space use case associated with "Return conference room to normal use" job step to ensure equipment related to the fix is back online; alarms are enabled and is returned to programmed operations (i.e. release any associated overrides), and ensure lights go back to scheduled operation. In addition, it will verify fire horns and strobes are enabled (inform the HVAC Service Technician and | Conference Room Mode = Hot Repair Active ↓ Conference Room Mode = System Check ↓ Conference Room Mode = Idle |

| | -continued | | |
|---|---|---|---|
| | conference room to available in the conference room management system. Coordinates the enabling of fire horns & strobes with the Security Officer and verifies fire horns and strobes are re-enabled in the fire system. | Security Officer if they are not). | |

| Conference Room | Modes Settings | | |
|---|---|---|---|
| Application | Unoccupied | Diagnostic | Hot Repair Active |
| Temperature Control | Between 65 and 85 deg F. | Between 71 and 74 deg F. | Manual Control |
| Lighting Control | Lights = Off | Lights = On | Lights = On |
| Fire Alarm System | Active Automatic Monitoring | Inactive Monitored by Security Guard Active Monitoring Confirmation | |

Figure 10:
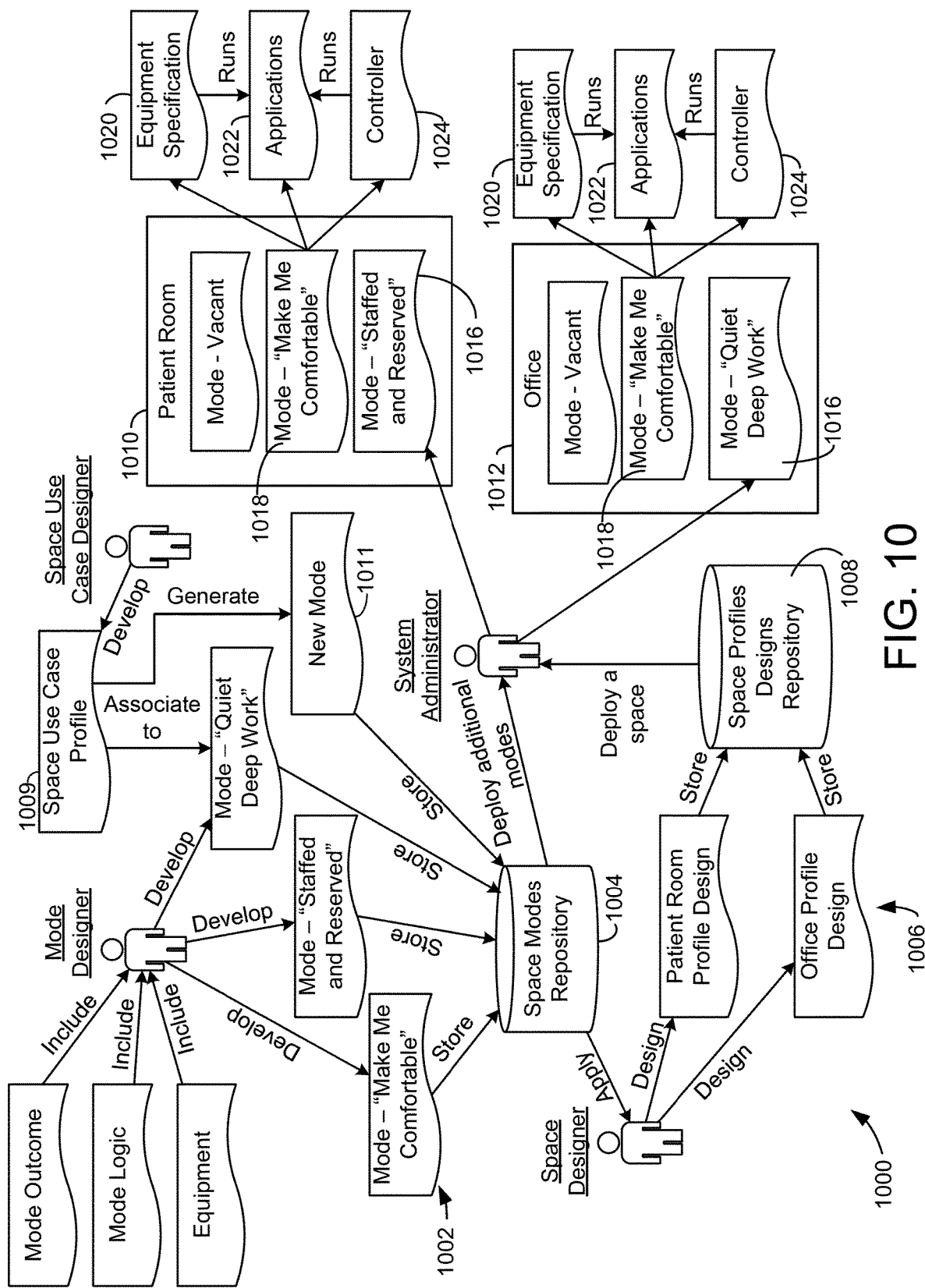
FIG. 10 is an illustration of a system for development and deployment of modes and space profiles, according to an exemplary embodiment.

Referring now to FIG. 10, an illustration of a system 1000 for development and deployment of mode profiles and space profiles consistent with the framework described herein is shown, according to an exemplary embodiment. As illustrated in FIG. 10, a mode designer may develop multiple modes 1002 and store the modes in a space modes repository 1004. It should be noted that in some embodiments modes may be developed independent of spaces. In some embodiments, modes may be development independent of any particular instance of a space but may require at least a generic space profile that facilitates development (e.g., by defining equipment, devices, etc. available to implement the mode).

A space designer may design multiple space profiles 1006, for example by including modes 1002 from the space modes repository 1004 in one or more of the space profiles 1008. The space profiles may be stored in a space profile designs repository 1008. A space use case designer may design a space use case to create a space use case profile 1009. The space use case profile 1009 may be associated to an existing mode 1002 (e.g., a mode developed by the mode designer) or may cause the automatic generation of a new mode 1011. The automatically-generated new mode 1011 is stored in the space modes repository 1004.

A system administrator may then deploy a space profile from the space profile designs repository 1008 to real (i.e., physical) spaces. For example, the system administrator may deploy a patient room space profile 1010 for a patient room and an office space profile 1012 for an office. The system administrator may also deploy additional modes 1016 from the space modes repository 1004 to the active space profiles 1010, 1012. For example, the additional modes may correspond to space use cases not satisfied by the generic space profiles stored in the space profile design repository 1008. The system administrator may thereby customize the active space profiles 1010, 1012 to facilitate execution of space use cases and corresponding jobs and job steps, for example without interrupting online control. New modes 1011 that were automatically generated by the set of settings from a space use case may be deployed at the time the space use case is deployed, for example by deploying a new job, job step, and/or space use case.

FIG. 10 also illustrates that an active mode 1018 in a space profile may determine an equipment specification 1020, applications 1022, and controller 1024. The equipment 1020 and the controller 1024 may run the applications 1022.

Space-Aware Network Switch and Place-Aware Network Switch

Figure 11:
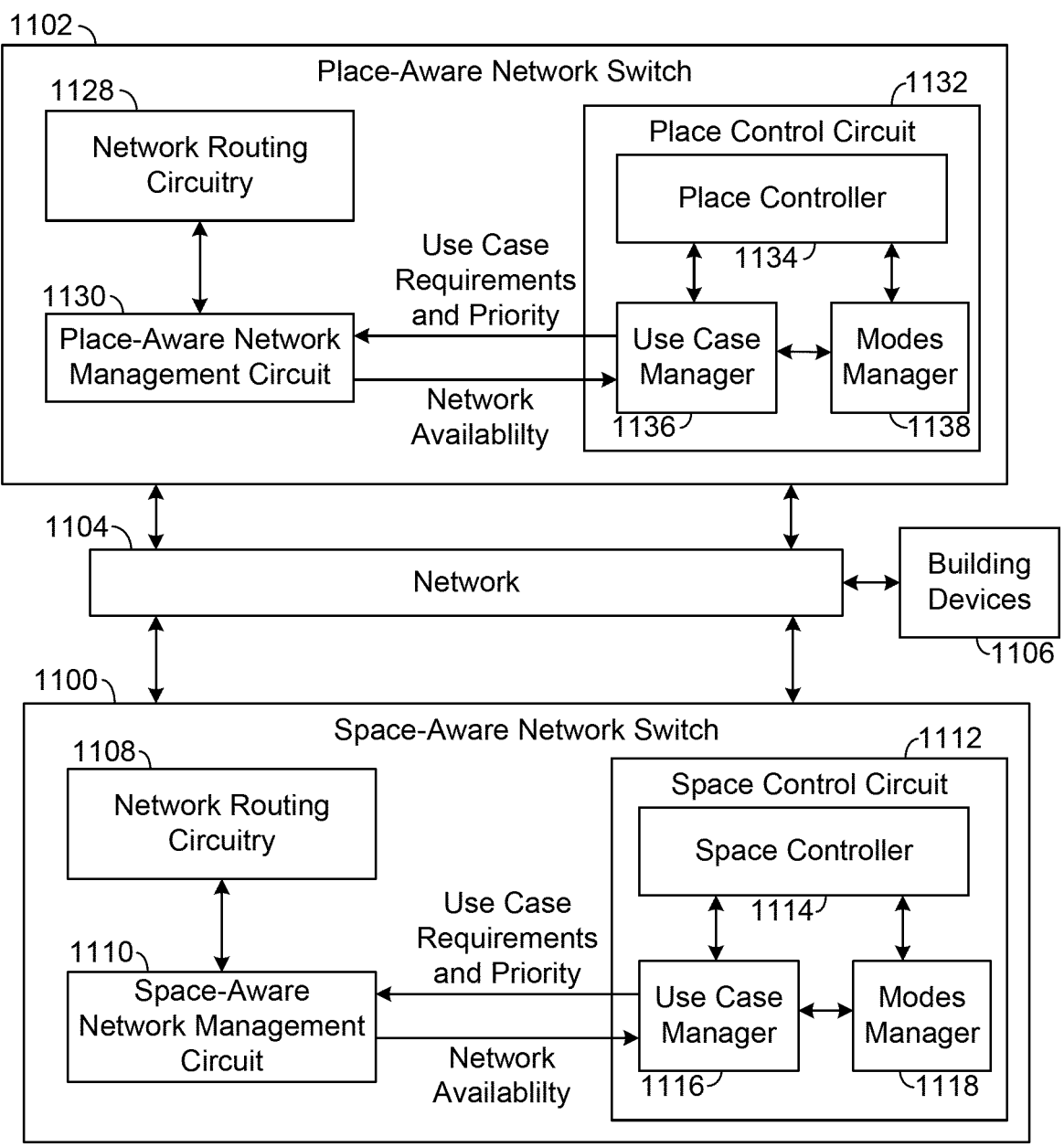
FIG. 11 is a block diagram of a space-aware network switch and a place-aware network switch, according to an exemplary embodiment.

Referring now to FIG. 11, a space-aware network switch 1100 and a place-aware network switch 1102 configured to operate in accordance with the space use case framework described above are shown, according to an exemplary embodiment. FIG. 11 shows a space-aware network switch 1100 and a place-aware network switch 1104 communicably coupled to a network 1104 that facilitates communications for (i.e., to, from, amongst, etc.) a plurality of building devices 1106 configured to serve a space or place. In some cases, the space-aware network switch 1100 and the place-aware network switch 1104 can be included in the unified building management system 206 of FIG. 2. The space-aware network switch 1100 is associated with a space (i.e., facilitates operation of devices that serve the space and network communications of the space) and the place-aware network switch 1104 is associated with a place that includes the space (i.e., facilitates operation of devices that serve the place and network communications of the place, including spaces therein).

The space-aware network switch 1100 is shown to include network routing circuitry 1108 coupled to a space-aware network management circuit 1110 and a space control circuit 1112. In the embodiment shown, the network routing circuitry 1108, the space-aware network management circuit 1110, and the space control circuit 1112 are physically coupled and located proximate one another, for example housed within a housing of the space-aware network switch 1100.

The network routing circuitry 1108 is configured to route network communications associated with the building devices 1106 according to one or more network parameters. The network routing circuitry 1108 is configured to allocate bandwidth, quality of service, and/or other network parameters to various pathways between the building devices 1106, the space control circuit 1112, and/or external data sources (e.g., an internet-based weather service, a remote database, etc.). The network routing circuitry 1108 is configured to receive values of the network parameters from the space-aware network management circuit 1110 and allocate network resources and route network communications accordingly. The network routing circuitry 1108 facilitates the space control circuit 1112 in providing space use cases for the space by providing for the exchange of data and control signals between the space control circuit 1112 and the network routing circuitry 1108.

The space control circuit 1112 is configured to control the devices 1106 to provide space use cases for the space 100 in accordance with the framework and approaches described above with reference to FIGS. 1-10. The space control circuit 1112 is shown to include a space controller 1114, a use case manager 1116, and a modes manager 1118. In some cases, the space control circuit 1112 corresponds to the space controller 612 of FIG. 6.

The use case manager 1116 is configured to store manage space use cases for the space. The use case manager 1116 can determine a set of enabled space use cases for the space and store data, logic, code, etc. relating to the enabled space use cases. As used herein, a space use case is "enabled" when the space use case is available for execution by the space controller 1112 to control the devices 1106 to provide the space use case at the space. The use case manager 1116 is configured to update the enabled space use cases. For example, in some cases the use case manager 1116 is configured to enable a dormant (disabled) space use case by enabling pre-installed logic at the space controller 1114. In some cases, the use case manager 1116 is configured to enable a space use case by downloading and installing a space use case profile from an external database (e.g., from instance profiles repository 204). The use case manager 1116 can associate a priority with each of the enabled space use cases, for example arranging space use cases from high priority to low priority. Various systems and methods for creation and installation of space use cases are described in detail above.

Figure 12:
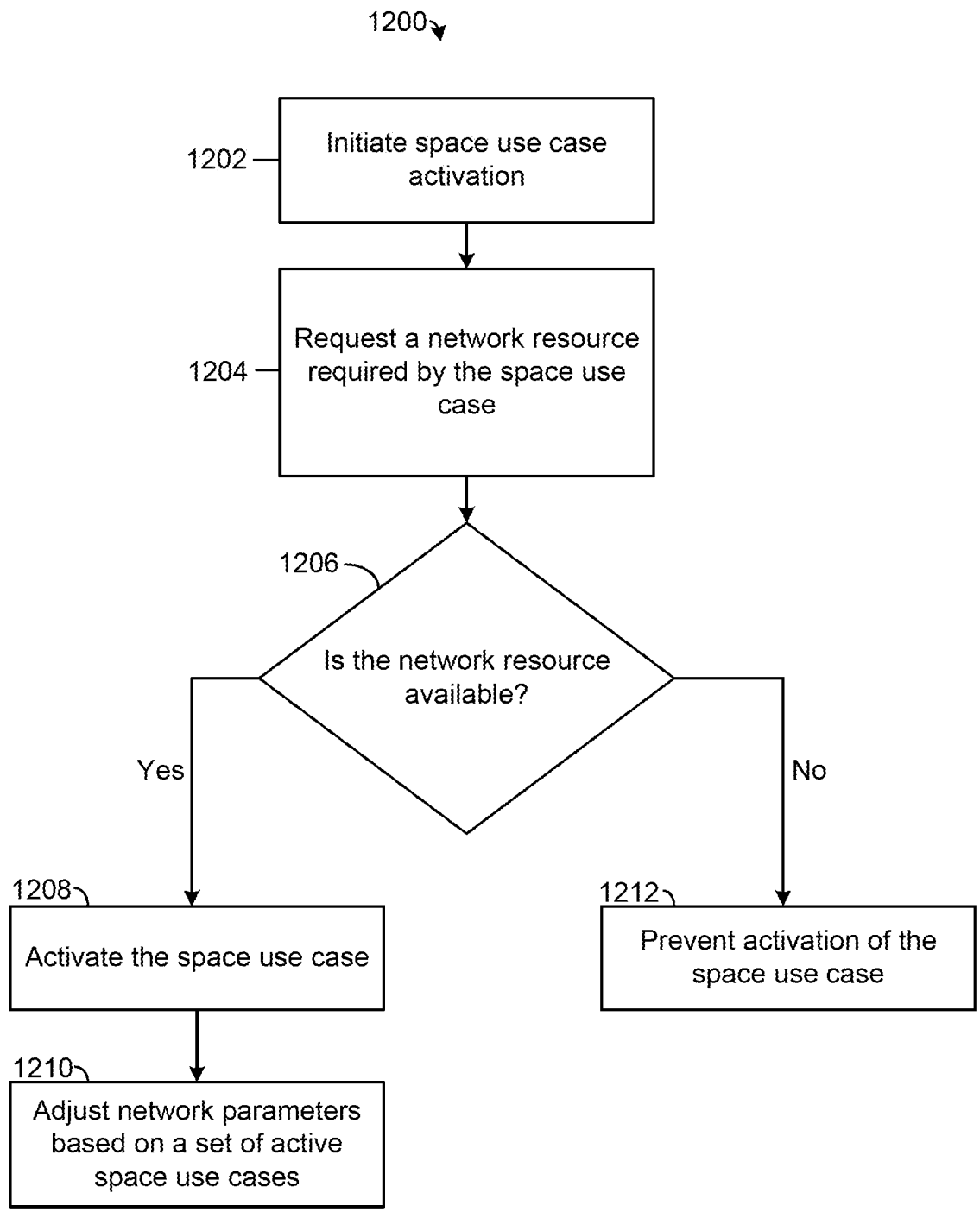
FIG. 12 is a flowchart of a process for activating space use cases at the network switches of FIG. 11, according to an exemplary embodiment.

As described herein, an enabled space use case can be "active" (i.e., currently being executed at the space) or "inactive" (i.e., available to be executed at the space in response to occurrence of a trigger condition). The use case manager 1116 is configured to activate and deactivate space use cases in accordance with trigger conditions associated with the space use cases. Various examples of triggers conditions for space use cases are provided above. In some cases, the use case manager 1116 is configured to check the availability of devices and/or network resources required for the space use case before activating the space use case. For example, as shown in FIG. 12 and described in detail with reference thereto, the use case manager 1116 can receive an indication of available network resources from the space-aware network management circuit 1110 and use the indication to determine whether a required network resource for a particular space use case is available before activating the space use case.

The modes manager 1118 is configured to manage modes for the space. For example, as described above, one or more modes can be associated with a space use case. The modes manager 1118 is configured to provide the space controller with the settings, etc. required to execute mode(s) associated with active use cases. In various embodiments, the modes manager 1118 includes and/or can execute functions attributed above to the mode generator 703, space controller 704, mode blender circuit 706, and event manager circuit 708 of FIG. 7.

The space controller 1114 is configured to generate control signals for the devices 1106 that cause the devices 1106 to operate in accordance with active space use cases. For example, the space controller 1114 can distribute settings to the devices 1106 that control the devices 1106 to enter a mode for an active space use case. The space controller 1114 communicates with the devices 1106 using network communications via the network 1104 and the network routing circuitry 1108. For some space use cases, the space controller 1114 is configured to communicate with an external data source (e.g., an internet-accessible data stream, weather service, a calendaring system, a room reservation system, etc.) via the network 1104 and network routing circuitry 1108 to facilitate execution of an active space use case. In some cases, the place-aware network switch 1102 manages external communications (e.g., communications to external data sources) for the place, i.e., for multiple spaces and multiple space-aware network switches 1100. The place-aware network switch 1102 can thereby facilitate the space controller 1114 in executing a space use case that involves communication with an external data source.

When the set of space use cases enabled and/or activated by the use case manager 1116 changes, the network routing parameters needed to efficiently provide the network communications between the space controller 1114, the devices 1106, and various other systems or data sources accessible via the network 1104 also change. Accordingly, a static routing of network signals between various devices may therefore restrict the ability of the space control circuit 1112 receive and provide the network communications needed to provide the active space use cases and determine when to enable a disable space use case. As described in detail below, the space-aware network management circuit 1110 is configured to dynamically update one or more network routing parameters to configure the network routing circuitry 1108 in accordance with the requirements of the active and/or enabled space use cases.

The space-aware network management circuit 1110 is configured to interact with the space control circuit 1112 to facilitate cooperation between the network routing circuitry 1108 and the space control circuit 1112. The space-aware network management circuit 1110 is also configured to determine an availability of network resources (e.g., amount of bandwidth available, channels available, quality of service available) and provide an indication of the available network resources to the space control circuit 1112, for example as described below with reference to FIG. 12. The space-aware network management circuit 1110 is also configured to determine values for the one or more network parameters, for example based on a set of space use cases provided by the space control circuit 1112. In some embodiments, the space-aware network management circuit 1110 is configured to determine values for the one or more network parameters based on the enabled space use cases for the space, based on the active space use cases for the space, or some combination thereof.

As described in detail below, each space use case is defined by a space use case profile. In the embodiments described with reference to FIGS. 11-12, each space use case profile includes a network resources attribute that describes the network resources required for or preferred for execution of the corresponding space use case. For example, a space use case that includes streaming video (e.g., for a video conference, for security monitoring, etc.) may have a network resources attribute that indicates that a network bandwidth sufficient to stream video is required for the space use case. As another example, a fire detection space use case may include a network resources attribute that indicates that a network channel be reserved exclusively for fire-detection-related signals to insure that signals indicative of a fire in a space are not blocked by other network traffic. As another example, a space use case use relating to an unoccupied space/mode may have a network resources attribute that indicates that network communications associated the space use case can be given a low quality of service on the network. Many such examples are possible.

The space-aware network management circuit 1110 obtains the network resources attribute for the active and/or enabled space use cases and determines one or more network parameters for the network routing circuitry 1108 based on the network resources attributes. The space-aware network management circuit 1110 can also determine the one or more network parameters based on the relative priorities of the space use cases. For example, the space-aware network management circuit 1110 can select network parameters to allocate network resources amongst the various space use cases to ensure operation of higher priority space use cases while minimizing negative effects on lower priority space use cases.

When the use case manager 1116 enables or disables a space use case, the space-aware network management circuit 1110 can update the one or more network parameters and provide the updated network parameters to the network routing circuitry 1108. When the use case manager 1116 activates or inactivates a space use case, the space-aware network management circuit 1110 can update the one or more network parameters and provide the updated network parameters to the network routing circuitry 1108. The network routing circuitry 1108 is thereby controlled to dynamically update the bandwidth, quality of service, priority, etc. of various pathways and network traffic as needed to optimize the transmission of network communications used to execute active space use cases for the space.

As described in detail above, space use cases facilitate occupants and facility personnel in accomplishing job steps and jobs relating to a space. By updating network parameters as described above, the space-aware network switch 1100 dynamically adjusts network routing, performance, etc. to best support occupants and facility personnel in accomplishing these job steps and jobs. The space-aware network switch 1100 thereby aligns network management for a space directly with the goals and needs of occupants and facility personnel relating to the space, which may result in reduced lag times and reduced error rates for network transmissions, and therefore improved control of building devices in supporting use of a space.

Additionally, by including the space control circuit 1112 in the space-aware network switch 1100, space control failure due to remoting networking problems can be reduced and local network response speeds can be increased. The combination of the space control and networking in the network switch 1100 may reduce the risk of cyber-attacks by placing multiple software components within a boundary (i.e., within the switch 1100) for which trust can be established in a single verification process and for which secure software updates, etc. can be simplified.

FIG. 11 also shows a place-aware network switch 1102 communicable with the network 1104. The place-aware network switch 1102 can perform similar functions as the space-aware network switch 1100 a place that includes multiple spaces (including the space served by the space-aware network switch 1100). The place-aware network switch 1102 is shown to include network routing circuitry 1128, a place-aware network management circuit 1130, and a place control circuit 1132.

The network routing circuitry 1128 is configured to route network communications for the place according to one or more network parameters. The network routing circuitry 1128 may facilitate network communications between multiple spaces, for example between building devices 1106 that serve different spaces, between the space-aware network switch 1100 and space-aware network switches for other spaces, etc. The network routing circuitry 1128 may facilitate network communications associated with devices 1106 that serve multiple spaces, for example central plant equipment, building HVAC equipment, etc. The network routing circuitry 1128 may also facilitate routing of network communicates associated with place use cases, for example an emergency evacuation use case.

The place control circuit 1132 is configured to control various devices 1106 to provide place use cases and provide information about place use cases to the place-aware network manager 1130 to facilitate network management based on place use cases. The place control circuit 1132 is shown to include a place controller 1134, a use case manager 1136, and a modes manager 1138.

The place controller 1134, the use case manager 1136, and the modes manager 1138 are configured to execute similar functions as the space controller 1114, the use case manager 1116, and the modes manager 1118 of the space control circuit 1112 described above. The use case manager 1136 is configured to enable/disable place use cases and to activate/inactive enabled place use cases in response to trigger conditions. The use case manager 1136 may receive information relating to network resource availability from the place-aware network management circuit 1130 and use the information in determine whether to enable or activate a place use case. The modes manager 1138 is configured to provide logic, settings, etc. that can be distributed to the devices 1106 by the place controller 1134 to provide mode(s) associated with active use cases.

The use case manager 1136 of the place control circuit 1132 is configured to provide an indication of the active and/or enabled place use cases to the place-aware network management circuit 1130. The use case manager 1136 may also provide a network resources attribute for each place use case, a priority information for the place use cases, and/or other information relating to the place use cases. As described in detail above with reference to the space-aware network management circuit 1110, the place-aware network management circuit 1130 is configured to determine one or more network parameters for the network routing circuitry 1128 to optimize network communications for the active or enabled place use cases. For example, in a scenario with an active emergency evacuation use case, the place-aware network circuit 1130 may ensure that network resources are reserved for evacuation messages, emergency responders voice communication, and remote data backup, prioritized such that evacuation messages take priority over emergency responder communications, which take priority over remote data backup communications. Many other examples are possible.

The place-aware network switch 1102 thereby dynamically adjusts network routing, performance, etc. to best support place use cases, and thereby support occupants and facility personnel in accomplishing job steps and jobs relating to the place. In some embodiments, the place-aware network switch 1102 interacts with one or more space-aware network switches 1100 to provide holistic network management for spaces and places to support occupants and facility personnel in accomplishing job steps and jobs relating to the spaces and places. The systems and methods described herein thereby ensure that the network parameters such as bandwidth, quality of service, etc. for various network communications are tailored to match the importance of the various communications for the occupants and facility personnel of the building.

Referring now to FIG. 12, a flowchart of a process 1200 for activating space use cases is shown, according to an exemplary embodiment. The process 1200 can be executed by the space-aware network switch 1100. The embodiment of process 1200 refers to space use case activation, i.e., for selecting a space use case as an active space use case so that the space use case is currently being executed. In other embodiments, the process 1200 can be adapted for space use case enablement, i.e., for selecting a space use case as an enabled use case so that the space use case is available for activation. Furthermore, while the embodiment of process 1200 shown in FIG. 12 and described herein refers to space use cases, it should be understood that the process 1200 can also be implemented for place use cases at the place-aware network switch 1102.

At step 1202, space use case activation is initiated. In some embodiments, the space control circuit 1112 detect an occurrence of a trigger condition associated with a space use case, for example based on sensor measurements of the building devices 1106 or user input to a user interface of a building device 1106. In response to determining that the trigger condition for the space use case is occurring, the space control circuit 1112 can initiate activation of the space use case.

At step 1204, a network resource required by the space use case is requested. For example, a space use case profile for the space use case triggered at step 1202 may store a network resource attribute that identifies a network resource (e.g., network routing, bandwidth, quality of service parameters, etc.) required for the space use case to be executed properly. In some embodiments, the use case manager 1116 provides the network resource attribute to the space-aware network management circuit 1110 to request that the network resource be allocated for the space use case.

At step 1206, a determination is made regarding whether the requested network resource is available. For example, the network 1104 and/or network routing circuitry 1108 may only provide for network communications up to a maximum total bandwidth on a particular number of communication channels. At step 1206, the space-aware network management circuit 1110 may evaluate existing allocations of network resources and previous network resource requests corresponding to already-active space use cases and determine whether one or more parameters of the network communications can be adjusted to allocate the requested network resource for the space use case triggered at step 1202 while also meeting other existing network requirements.

In response to a determination that the network resource is available, at step 1208 the space use case is activated. That is, in the example of FIG. 11, the use case manager instructs the space controller 1114 to control the devices 1106 in accordance with the space use case. In some cases, the mode manager 1118 selects a mode to apply to control the devices 1106 in accordance with the space use case.

At step 1210, the network parameters are adjusted based on a set of active space use cases for the space. In the example of FIG. 11, the network management circuit 1110 adjusts the network parameters to provide the network resources required by the active space use cases for the space and/or to reprioritize network resources associated with the active space use cases. Accordingly, the network routing circuitry 1112 adjust the routing, bandwidth allocation, quality of service, etc. of network communications to allow proper operation of the space use case triggered at step 1202 in addition to other active space use cases. The space use case is thereby activated to facilitate a job or job step for occupants of the space with network communications adjusted to support the job or job step.

In response to a determination that the network resource is not available, activation of the space use case is prevented. The use case manager 1110 does not activate the space use case. The space-aware network switch 1100 thereby prevents a scenario in which an active space use case cannot be executed because the required network resources for the active space use case are not available. The space-aware network switch 1100 thereby also prevents a scenario in which network communications relating to active space use cases exceed the network resources such that multiple space use cases experience substantial delays, fail, crash, etc.

In some cases, in response to preventing activation of the space use case, the process returns to step 1202, where activation of an alternative space use case is activated, for example supporting the same job step as the space use case for which activation was prevented but providing different functionality that requires less network resources. In some embodiments, the use case manager 1110 can determine that an active space use case should be disabled in order to make network resources available for activation of different space use cases. The use case manager 1100 thereby facilitates activation of set of space use cases that support the job steps and jobs to be accomplished by occupants of the space.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As used herein, the terms "circuit", "repository," "controller," and "tool" used herein may include hardware structured to execute the functions described herein. In some embodiments, each respective "circuit", "repository," "controller," and/or "tool" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" "repository," "controller," or "tool" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit", "repository," "controller," or "tool" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A network switch, comprising:
    a device interface configured to facilitate communication between the network switch and a plurality of building devices that serve a space;
    network routing circuitry configured to route network communications associated with the building devices by allocating network resources in accordance with one or more network service parameters;
    a control circuit configured to:
        control the plurality of devices via the network communications to provide a plurality of space use cases for the space comprising a first space use case and a second space use case, the first space use case associated with a first set of values of the one or more network service parameters and the second space use case associated with a second set of values of the one or more network service parameters; and
        associate each space use case with a priority; and
    a network manager circuit configured to determine values for the one or more network service parameters based on which of the plurality of space use cases is active for the space and based on the priorities of the plurality of space use cases for the space.

2. The network switch of claim 1, wherein:
    the first space use case of the plurality of space use cases is associated with a first priority;
    the second space use case of the plurality of space uses cases is associated with a second priority; and
    the network manager circuit is configured to assign a first set of values for one or more quality of service parameters for communications relating to the first space use case and a second set of values for one or more quality of service parameters for communications relating the second space use case based on the first priority and the second priority.

3. The network switch of claim 1, wherein the control circuit is configured to select a set of the plurality of space use cases as active space use cases and update the set of active space use cases in response to an event or condition relating to the space; and
wherein the network manager circuit is configured to update the values for the one or more network service parameters based on a change to the subset of active space use cases.

4. The network switch of claim 1, wherein the one or more network service parameters comprise at least one of a quality of service parameter, a network routing parameter, or a dedicated bandwidth.

5. The network switch of claim 1, wherein the network manager circuit is configured to provide an indication of an availability of the network resources to the control circuit; and
wherein the control circuit is configured to:
initiate activation of the first space use case of the plurality of space use cases, a first network resource required for execution of the first space use case;
determine, based on the indication of the availability of network resources, whether the first network resource is available;
activate the first space use case in response to a determination that the first network resource is available; and
prevent the activation of the first space use case in response to a determination that the first network resource is not available.

6. The network switch of claim 1, wherein the building devices are associated with a plurality of building domains.

7. The network switch of claim 1, wherein the building devices are associated with a plurality of building domains.

8. A method, comprising:
routing, at a network switch and in accordance with one or more network service parameters that allocate network resources, network communications associated with a plurality of building devices that serve a space;
controlling, via the network communications, the plurality of building devices to provide a plurality of space use cases for the space, wherein:
the plurality of space use cases comprises a first space use case and a second space use case;
the first space use case is associated with a first set of values of the one or more network service parameters and the second space use case is associated with a second set of values of the one or more network service parameters; and
each space use case is associated with a priority;
determining values for the one or more network service parameters based on which of the plurality of space use cases is active for the space and based on the priorities of the plurality of space use cases.

9. The method of claim 8, wherein the first space use case of the plurality of space use cases is associated with a first priority and the second space use case of the plurality of space uses cases is associated with a second priority; and
wherein adjusting the values for the one or more network service parameters based on the priorities of the plurality of space use cases for the space comprises assigning a first set of values for one or more quality of service parameters for network communications relating to the first space use case and a second set of values for quality of service parameters for network communications relating the second space use case based on the first priority and the second priority.

10. The method of claim 8, comprising:
selecting a set of the plurality of space use cases as active space use cases;
updating the set of active space use cases in response to an event or condition relating to the space; and
reallocating the network resources by updating the values for the one or more network service parameters based on a change in the subset of active space use cases.

11. The method of claim 8, wherein the one or more network service parameters comprise at least one of a quality of service parameter, a network routing parameter, or a dedicated bandwidth.

12. The method of claim 8, comprising:
obtaining an indication of an availability of the network resources;
initiating activation of a first space use case of the plurality of space use cases, a first network resource required for execution of the first space use case;
determining, based on the indication of the availability of network resources, whether the first network resource is available;
activating the first space use case in response to a determination that the first network resource is available; and
preventing the activation of the first space use case in response to a determination that the first network resource is not available.

13. A building management system, comprising:
a plurality of building devices configured to serve a space;
a network switch communicably coupled to the network, the network switch comprising:
network routing circuitry configured to route network communications associated with the building devices by allocating one or more network resources in accordance with one or more quality of service parameters;
a control circuit coupled to the network circuitry and configured to:
control the plurality of devices via the network communications to provide a plurality of space use cases for the space; and
associate each space use case with a priority; and
a network manager circuit coupled to the control circuit and configured to:
determine values for the one or more quality of service parameters based on which of the plurality of space use cases is active for the space and based on the priorities of the plurality of space use cases for the space.

14. The building management system of claim 13, wherein the control circuit is configured to select a set of the plurality of space use cases as active space use cases and update the set of active space use cases in response to an event or condition relating to the space; and
wherein the network manager circuit is configured to update the values for the one or more quality of service parameters based on a change to the subset of active space use cases.

15. The building management system of claim 13, wherein the network manager circuit is configured to provide an indication of an availability of the one or more network resources to the control circuit; and wherein the control circuit is configured to:
initiate activation of a first space use case of the plurality of space use cases, a first network resource required for execution of the first space use case;
determine, based on the indication of the availability of network resources, whether the first network resource is available;
activate the first space use case in response to a determination that the first network resource is available; and
prevent the activation of the first space use case in response to a determination that the first network resource is not available.

16. The building management system of claim 13, wherein the building devices are associated with a plurality of building domains.

17. The building management system of claim 13, wherein the network communications are transmitted using an internet protocol.

* * * * *